(12) United States Patent
Ginetti et al.

(10) Patent No.: US 7,555,739 B1
(45) Date of Patent: Jun. 30, 2009

(54) METHOD AND APPARATUS FOR MAINTAINING SYNCHRONIZATION BETWEEN LAYOUT CLONES

(75) Inventors: Arnold Ginetti, Antibes (FR); Jean-Marc Bourguet, Puget sur Argens (FR); Gerard Tarroux, Villeneuve-Loubet (FR); Laurent Chouraki, Antibes (FR); Fabrice Morlat, Juans les Pins (FR); Carole Perrot, Nice (FR)

(73) Assignee: Cadence Design Systems, Inc., San Jose, CA (US)

( * ) Notice: Subject to any disclaimer, the term of this patent is extended or adjusted under 35 U.S.C. 154(b) by 239 days.

(21) Appl. No.: 11/505,752

(22) Filed: Aug. 17, 2006

(51) Int. Cl.
  *G06F 17/50* (2006.01)
(52) U.S. Cl. .................. 716/11; 716/2; 716/3
(58) Field of Classification Search ............... None
  See application file for complete search history.

(56) References Cited

U.S. PATENT DOCUMENTS

| 5,050,091 A | * | 9/1991 | Rubin | 716/10 |
| 6,230,305 B1 | * | 5/2001 | Meares | 716/11 |
| 7,398,492 B2 | * | 7/2008 | Youngman et al. | 716/5 |

* cited by examiner

*Primary Examiner*—Leigh Marie Garbowski
(74) *Attorney, Agent, or Firm*—Moser IP Law Group

(57) ABSTRACT

A method and system for maintaining synchronization between a plurality of layout clones of an integrated circuit design, wherein each layout clone comprises at least one figure. The method comprises tracking relationships between equivalent figures of the plurality of layout clones, wherein the plurality of layout clones are associated with one another within an equivalence group and propagating an edit made in one of the layout clones within an equivalence group to the other layout clones within the equivalence group.

33 Claims, 16 Drawing Sheets

METHOD AND APPARATUS FOR MAINTAINING SYNCHRONIZATION BETWEEN LAYOUT CLONES

FIELD OF THE INVENTION

The present invention relates to integrated circuit (IC) design layout. More specifically, the present invention relates to techniques for maintaining synchronization amongst clones of layout elements during IC design.

BACKGROUND OF THE INVENTION

Integrated circuit (IC) design is performed using graphical tools to define circuit elements and interconnect the circuit elements. In creating a "layout" that defines the positions and interconnections of the circuit elements, a designer may repetitively utilize blocks of circuitry throughout the layout. These blocks of circuitry are known as clones, since the content of each block is identical.

The process of generating an IC design layout using cloning is known in the art. The method consists of generating clones of the circuit blocks to be used in the layout that are duplicated a number of times throughout a design. Once the clones are generated, they have to be maintained in synchronization such that if one of the clones is edited, other clones should be modified to reflect the edit. A number of approaches to synchronize clones are known in the art.

In accordance with one approach, an additional level of physical hierarchy defining the clone content is introduced such that all the clone instances point to an additional level of hierarchy containing the clone layout information. Since all the clone instances point to a single "master", all the clones are maintained in synchronization. The drawback of the approach is that it introduces an additional level of hierarchy that is cumbersome for the user (e.g., the layout designer). Moreover, the approach is error-prone as the user may edit a clone out of context (of the master design).

In accordance with another approach to clone editing, all the clones except one are deleted. The remaining clone is edited and re-duplicated after it is edited to repopulate all the clone instances. In accordance with yet another approach to clone editing, a user individually updates the clones, one by one. Both of these approaches are cumbersome and error-prone.

Thus, there is a need for reducing the likelihood of layout error, preventing accidental editing of a clone and enabling automatic propagation of the changes made to one of the clones to all the clones without introducing a physical level of hierarchy.

SUMMARY OF THE INVENTION

The present invention provides a method and apparatus for maintaining synchronization of a plurality of clones having common layout figures. A layout figure refers to a layout of a circuit element(s) and connections there between formed from its corresponding schematic circuit. The clones having a common layout figure are referred to as synchronous clones and are associated with one another within an equivalence group. The equivalence group comprises a plurality of subgroups such that each subgroup is a collection of layout figures that form a clone. The subgroups may be hierarchical (i.e., may contain other subgroups). An edit to any clone within an equivalence group (i.e., a synchronous clone) results in the edit being propagated to all other synchronous clones in the equivalence group.

The present invention also provides a system and a computer readable program for the aforesaid method.

BRIEF DESCRIPTION OF THE DRAWINGS

The above and other items, features and advantages of the invention will be better understood by reading the following more particular description of the invention in conjunction with the accompanying drawings, wherein.

DETAILED DESCRIPTION

The present invention provides a method and apparatus for maintaining synchronization of a plurality of clones having common layout figures. A layout figure refers to a layout of a circuit element(s) and connections there between formed from its corresponding schematic circuit. The clones having a common layout figure are referred to as synchronous clones and are associated with one another within an equivalence group. The equivalence group comprises a plurality of subgroups such that each subgroup is a collection of layout figures that form a clone. The subgroups may be hierarchical (i.e., may contain other subgroups). An edit to any clone within an equivalence group (i.e., a synchronous clone) results in the edit being propagated to all other synchronous clones in the equivalence group.

Figure 1:
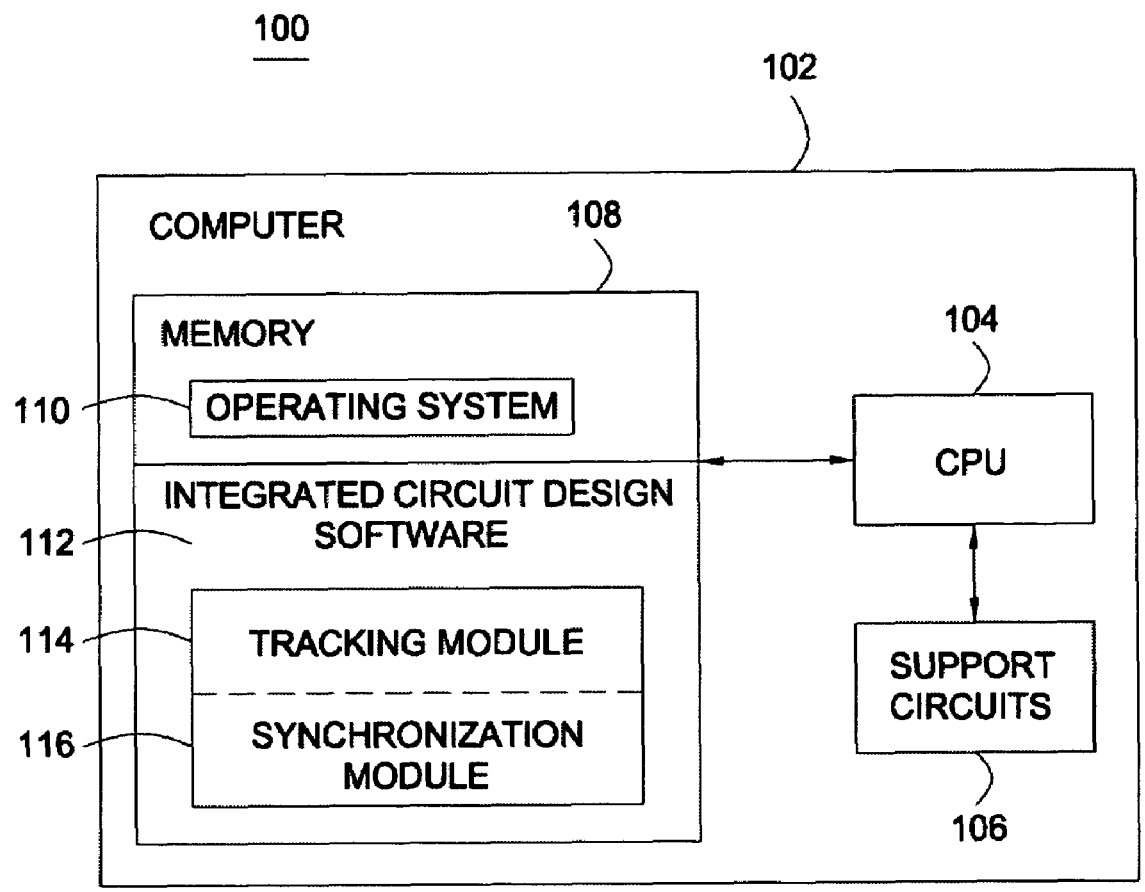
FIG. 1 illustrates a system for creating and maintaining clone synchronization within an IC layout in accordance with an embodiment of the present invention.

FIG. 1 depicts an exemplary system 100 used to implement the present invention. The system 100 comprises a general purpose computer 102 that, when executing certain software, becomes a specific purpose computer that performs the present invention. The computer 102 comprises at least one Central Processing Unit (CPU) 104, support circuits 106, and memory 108. Those skilled in the art will appreciate that the computer encompasses all types of computer systems: personal computers, midrange computers, mainframes, etc. Note that many additions, modifications, and deletions may be made to computer 102 within the spirit and scope of the present invention. Examples of possible additions include: a display, a keyboard, a cache memory, and peripheral devices such as printers.

CPU 104 may be any one of the many microprocessors that are commercially available. The support circuits 106 comprise circuits that facilitate operation of CPU 104 including clock circuits, cache, power supplies, input/output circuits and the like. The memory 108 may comprise one or more of read-only memory, random access memory, disk drives, optical memory, removable memory and the like. The memory 108 stores an operating system 110 and an integrated circuit design software 112. Integrated circuit design software 112 includes a tracking module 114 and a synchronization module 116. When CPU 104 executes integrated circuit design software 112, computer 102 processes input information to define an IC layout comprising at least two layout clones that are synchronous with one another. The layout clones comprise at least one "figure" and are considered to be related within an equivalence group. The tracking module 114 tracks relationships between equivalent figures of the synchronous clones. Further, tracking module 114 is configured to perform a consistency check. If the consistency check is successful, synchronization module 116 propagates an edit made in one of the synchronous clones to the other synchronous clones within a given equivalence group. In an embodiment, the edit is propagated via a data structure that links the equivalent figures in the equivalence group.

Tracking module 114 may also be configured to navigate the equivalent figures of the synchronous clones using data structures. Synchronization module 116 synchronizes the layout clones by adding an extension to the equivalence group once the synchronous clones are encapsulated in the equivalence group. Further, integrated circuit design software 112 creates a subgroup on each synchronous clone for encapsulating the layout implementation of the figures.

The "modules" are software code that may be a callable routine or embedded into another program, i.e., an operating system or application program. For example, although tracking module 114 and synchronization module 116 are shown as a separate software application or utility in accordance with one embodiment of the invention, it is equally within the scope of the present invention to provide the modules as a part of the operating system 110.

The present invention can take the form of an entirely hardware embodiment, an entirely software embodiment or an embodiment containing both hardware and software elements. In accordance with an embodiment of the present invention, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and DVD.

Figure 2:
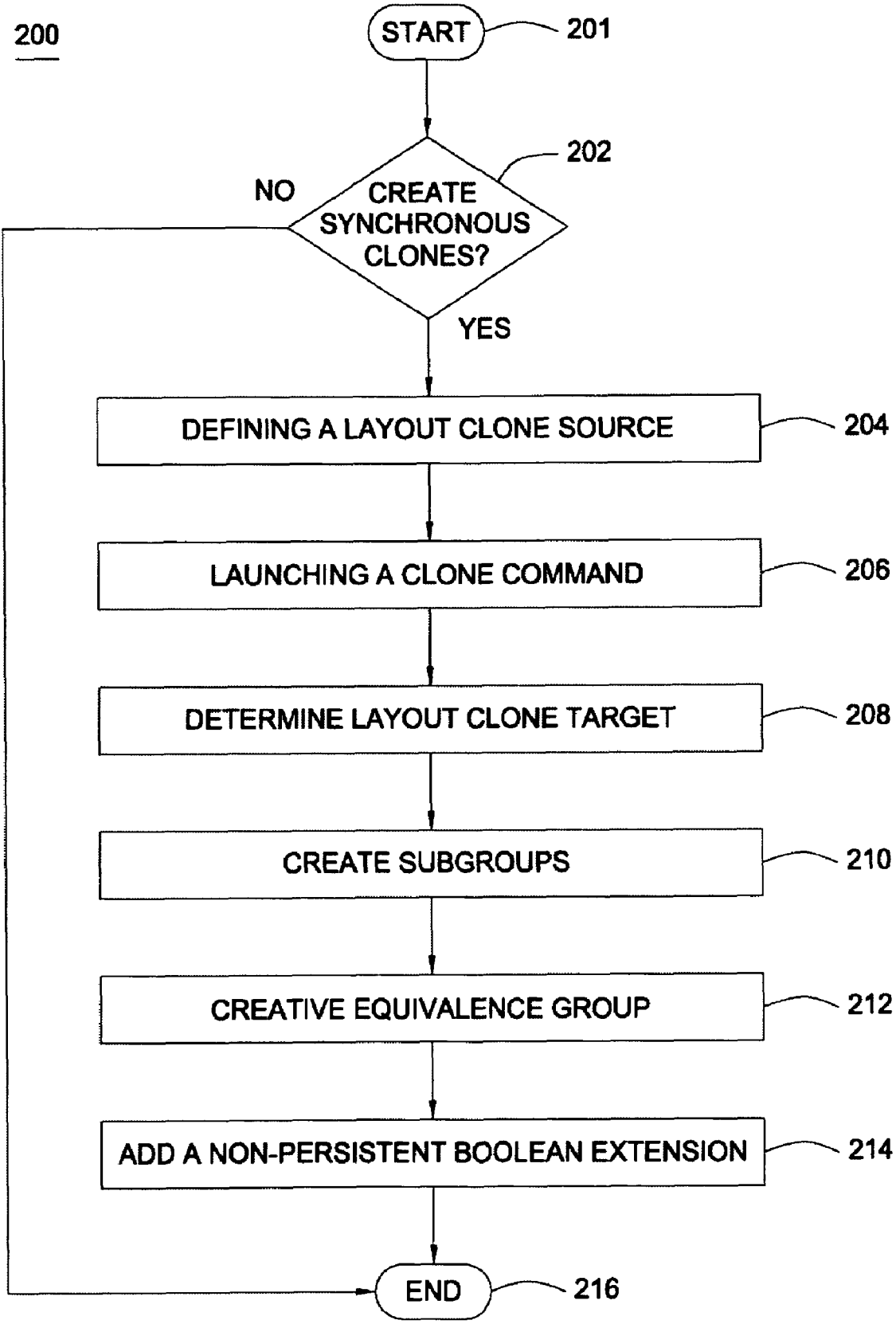
FIG. 2 illustrates a flowchart of a method of creating an equivalence group in accordance with an embodiment of the present invention.

FIG. 2 illustrates a flowchart for creating an equivalence group in accordance with an embodiment of the present invention. In accordance with an embodiment of the present invention, three types of clones may be created depending upon the clone required by a user. The three types of clones include free objects clones, grouped object clones and synchronous clones. The free objects clones are "regular" clones represented by a set of figures (including instances and geometries) at the top. The grouped object clones are also "regular" clones; however, they are represented by a set of figures encapsulated in a subgroup. The synchronous clones are layout clones encapsulated in an equivalence group such that the layout clones encapsulate the layout implementation of a clone source and/or a clone target. The formation and use of "regular" clones is known in the art and does not form a portion of the present invention.

The method 200 begins at block 201 and proceeds to block 202. At block 202, the user is queried whether he/she wants to create a synchronous clone. If the user wishes to create a synchronous clone, the user defines the layout clone source at block 204. Generally, this is performed through a graphical user interface (GUI) whereby the circuit elements within a layout are selected for cloning. The selected elements are defined by graphical figures (herein referred to as "figures").

Next, the user launches a clone command at block 206. The present invention determines layout clone target(s), if any, in the schematic at block 208. While creating synchronous clones from the given layout clone source for the first time, two subgroups are created at block 210. One of the subgroup represents the layout clone source while the other subgroup represents the layout clone target. The subgroups are created when the user enters a layout graphical window in order to place the clone target. In accordance with an embodiment of the present invention, the subgroups may contain physical information of the layout clone source/target. The physical information includes the physical shapes (rectangles, polygons, lines, paths, arcs, ellipses, dots, donuts and pathsegs), vias (custom vias and standard vias), instances and possibly other subgroups present in the layout clone source, which represent the layout implementation of the layout clone source and the layout clone targets. Moreover, the two subgroups may be ordered in such a way that corresponding figures may be in the same position. However, the figures connectivity may not be stored in the synchronous clones.

The subgroups are encapsulated in an equivalence group at block 212. However, if the equivalence group corresponding to the layout clone source already exists, only one subgroup is created for the clone creation of the layout clone target with the same layout clone source. The subgroup is added to the already existing equivalence group. Once the subgroup is created and added to the equivalence group, it is synchronized in terms of its construction.

When creating the equivalence group, a non-persistent boolean extension (for example, oaBooleanAppDef named "lxSCCheckDone") is added to the equivalence group at block 214. The extension indicates that the synchronous clones are consistent by construction. In accordance with an embodiment, the extension is added to each synchronous clone (if it is not already present on the equivalence group). The method 200 ends at block 216.

Figure 3:
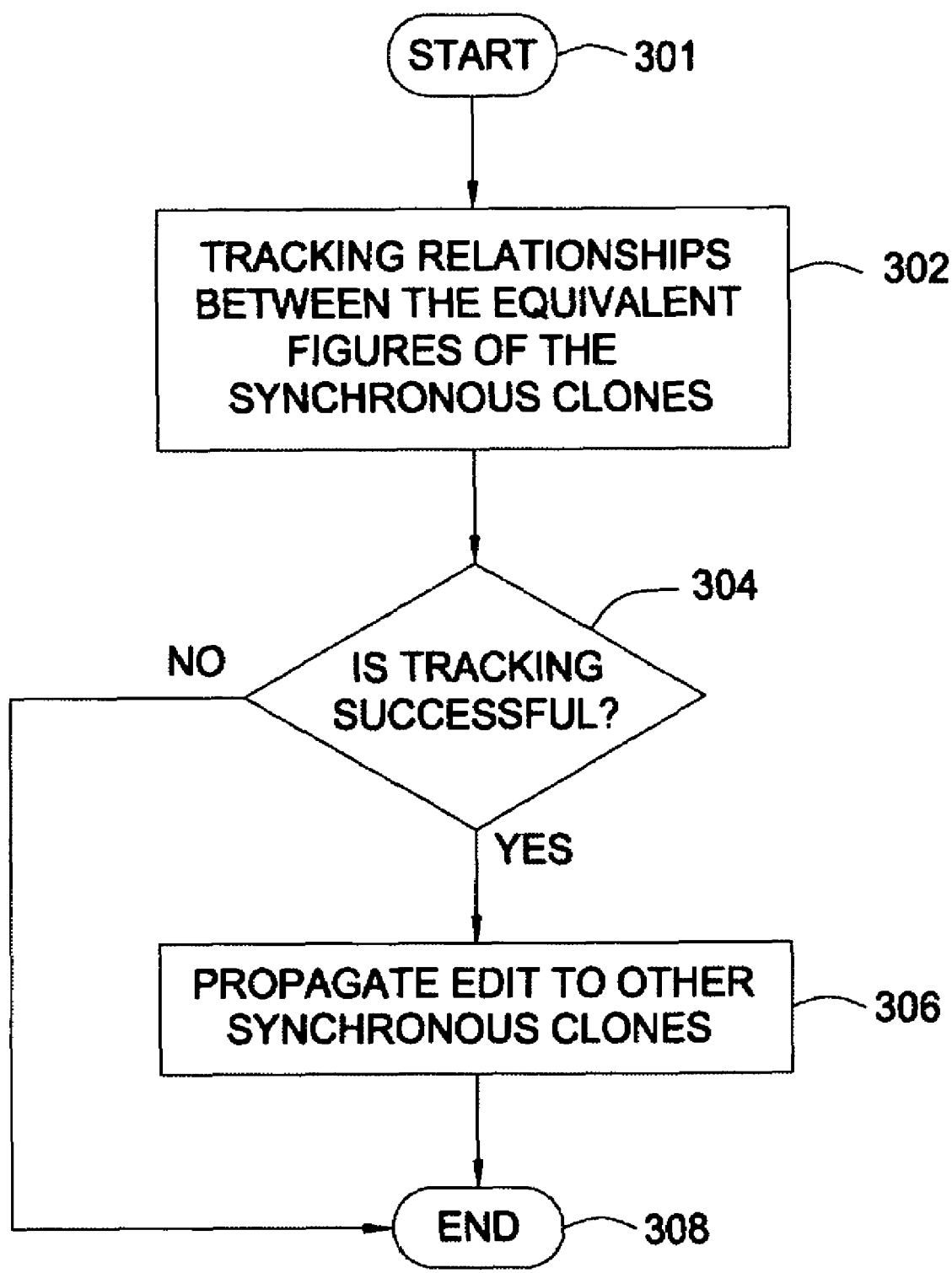
FIG. 3 illustrates a flowchart of a method of maintaining clone synchronization in accordance with an embodiment of the present invention.

FIG. 3 illustrates a flowchart of a method 300 for maintaining synchronization between at least two layout clones using the tracking module 114 to track the changes and using the synchronization module 116 to propagate the changes to all the clones of an equivalence group in accordance with an embodiment of the present invention. The method 300 begins at block 301 and proceeds to block 302.

At block 302, the relationships between the equivalent figures of the synchronous clones are tracked. In an embodiment, tracking includes checking the non-persistent boolean extension associated with the equivalence group. The presence or absence of the non-persistent boolean extension determines whether a consistency check is required when either a synchronous clone for a second target is created, or when one of the synchronous clones is edited. If the non-persistent boolean extension is not present, a consistency check is performed to determine whether the layout clones of the equivalence group are synchronized. At block 304, a check is performed to verify if the tracking is successful. If tracking is successful, an edit made to one of the synchronous clones is propagated to the other synchronous clones at block 306. However, if tracking is unsuccessful, other synchronous clones are not updated and method 300 ends at block 308.

Figure 4:
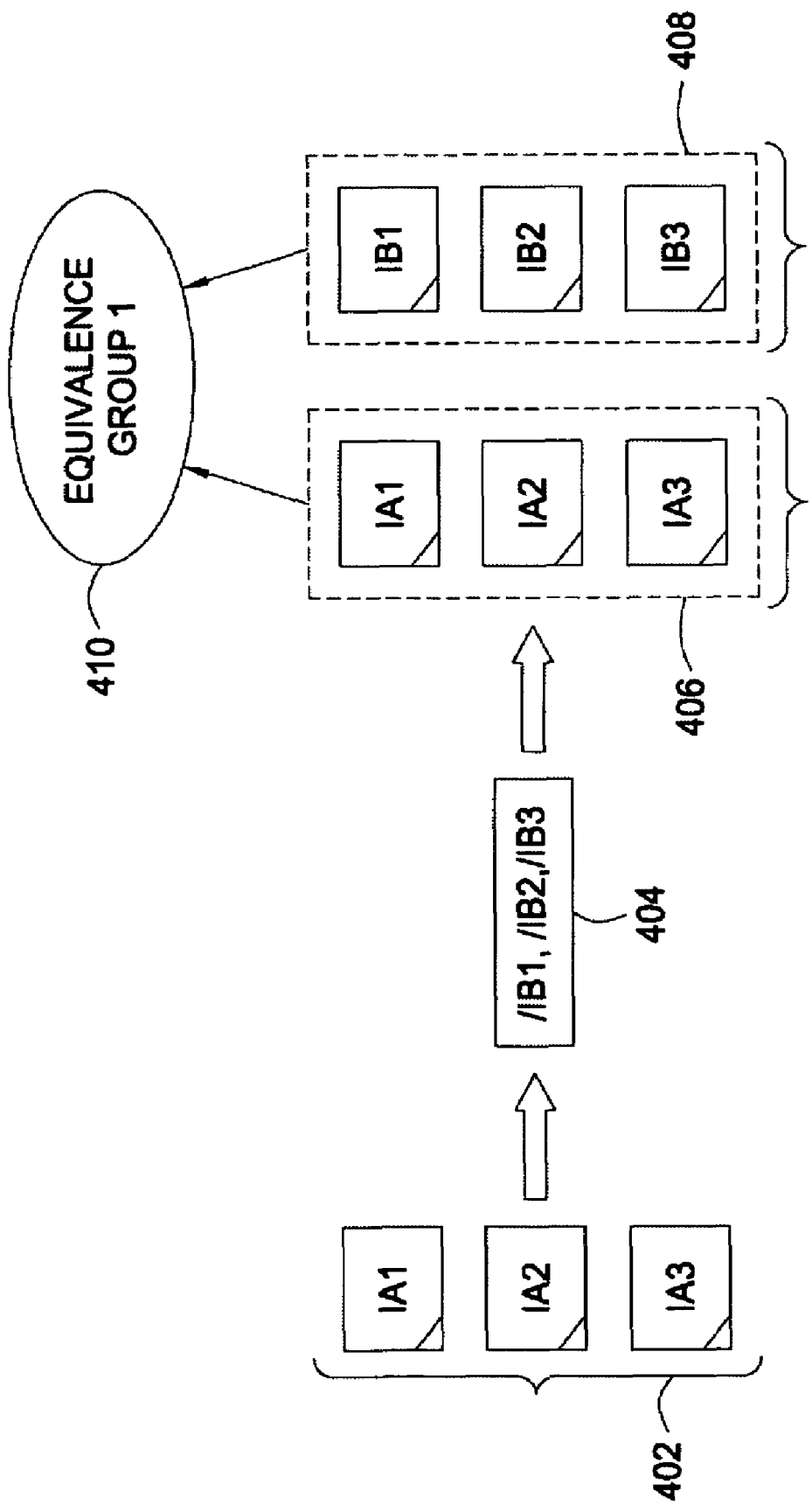
FIG. 4 illustrates an exemplary representation of creation of the synchronous clones in accordance with an embodiment of the present invention.

Specifically, FIG. 4 illustrates a layout clone source 402 defined by the user. Layout clone source 402 comprises three figures namely, instances IA1, IA2, and IA3. When the synchronous clones having layout clone source 402 as the clone source are to be created, a clone command is launched. A clone target is found in schematic 404 having three instances IB1, IB2 and IB3, and is placed as a synchronous clone within a layout. Next, two subgroups 406 and 408 are created. The corresponding figures of two subgroups 406 and 408 have the same position (i.e. IA1 and IB1 are the first figures of subgroups 406 and 408, IA2 and IB2 are the second figures of subgroups 406 and 408 respectively, and IA3 and IB3 are the third figures of subgroups 406 and 408 respectively). An equivalence group 410 is created comprising subgroups 406 and 408.

In accordance with an embodiment of the present invention, the synchronous clones within the equivalence group 410 may be edited as a single entity. The subgroups 406 and 408 representing the synchronous clone may be transformed, for example, moved or rotated, as the single entity. In accordance with another embodiment of the present invention, the figures of the subgroup may be edited. To edit the figures comprising the synchronous clone, the user selects an option, for example, "Edit subgroup in place", from a graphical user interface. The edits made to the subgroup are propagated to the other subgroups of the equivalence group only if the consistency check is successful. A person skilled in the art will appreciate that the subgroup figures edited using other methods, for example, using SKILL language, fall within the scope of the present invention. The subgroups as well as the equivalence group form virtual levels of hierarchy introduced on the synchronous clones.

Figure 5:
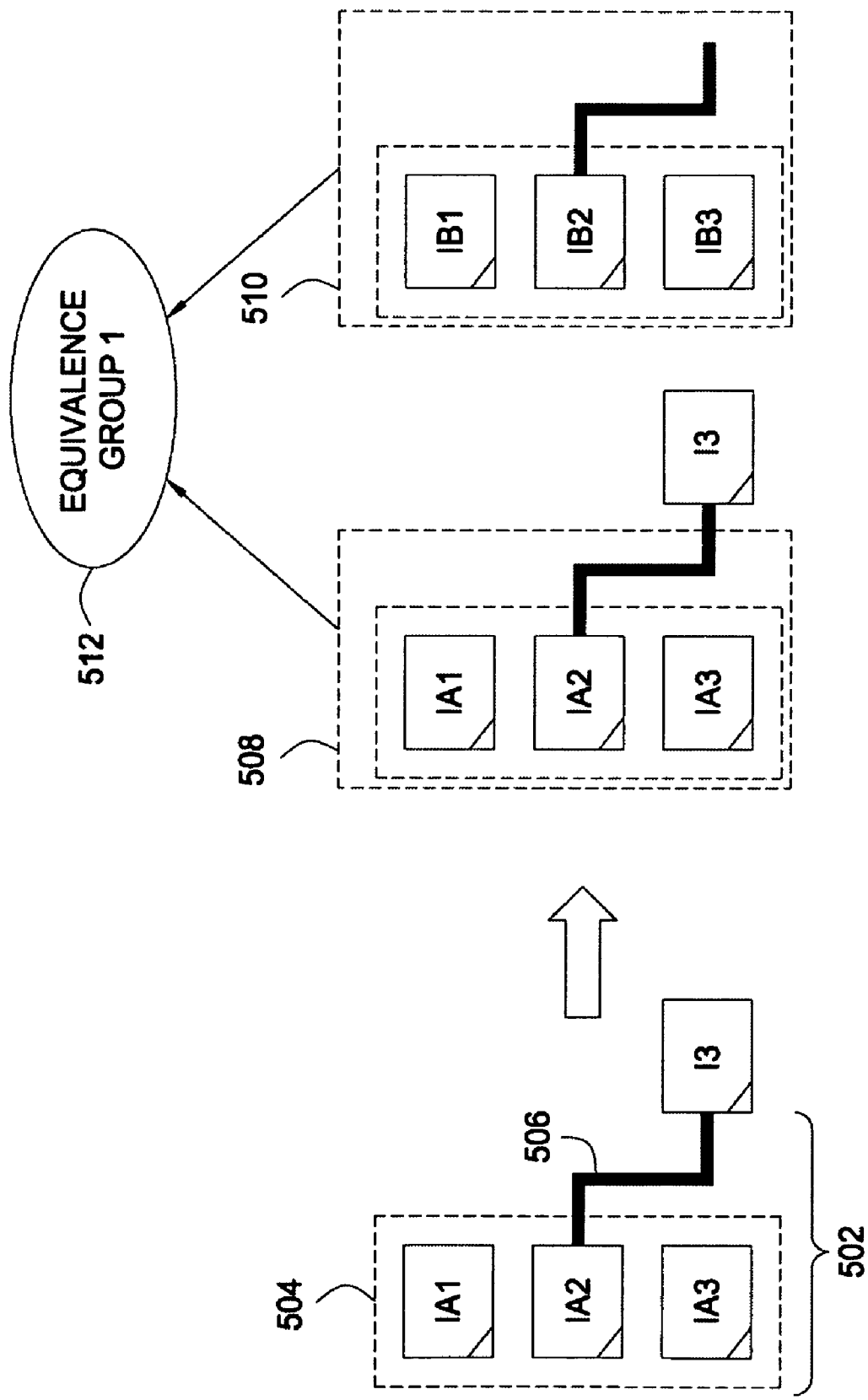
FIG. 5 represents the creation of synchronous clones having a layout clone source containing at least one subgroup in accordance with an embodiment of the present invention.

FIG. 5 represents the creation of the synchronous clones having a layout clone source containing at least one regular subgroup in accordance with an embodiment of the present invention. The clone source may be composed of one or several regular subgroup(s) and other shapes, for example, route. After the synchronous clone is created, another level of virtual hierarchy is added to the subgroups to represent the synchronous clones.

Layout clone source 502 consists of regular subgroup 504 and route 506 in the initial topology. To create a synchronous clone of layout clone source 502, two subgroups 508 and 510 are created. First, subgroup 508 is created, encapsulating layout clone source 502. Then, subgroup 508 is copied, and another subgroup, 510, is created to encapsulate the clone target. Subgroups 508 and 510 are added to an equivalence group 512 representing synchronous clones.

Although the embodiment is described using a clone source comprising a regular subgroup, the present invention encompasses the clone source composed of one or more regular subgroup(s) and other shapes. In this case, another hierarchical level of subgroup may be added to represent the synchronous clones.

Figure 6:
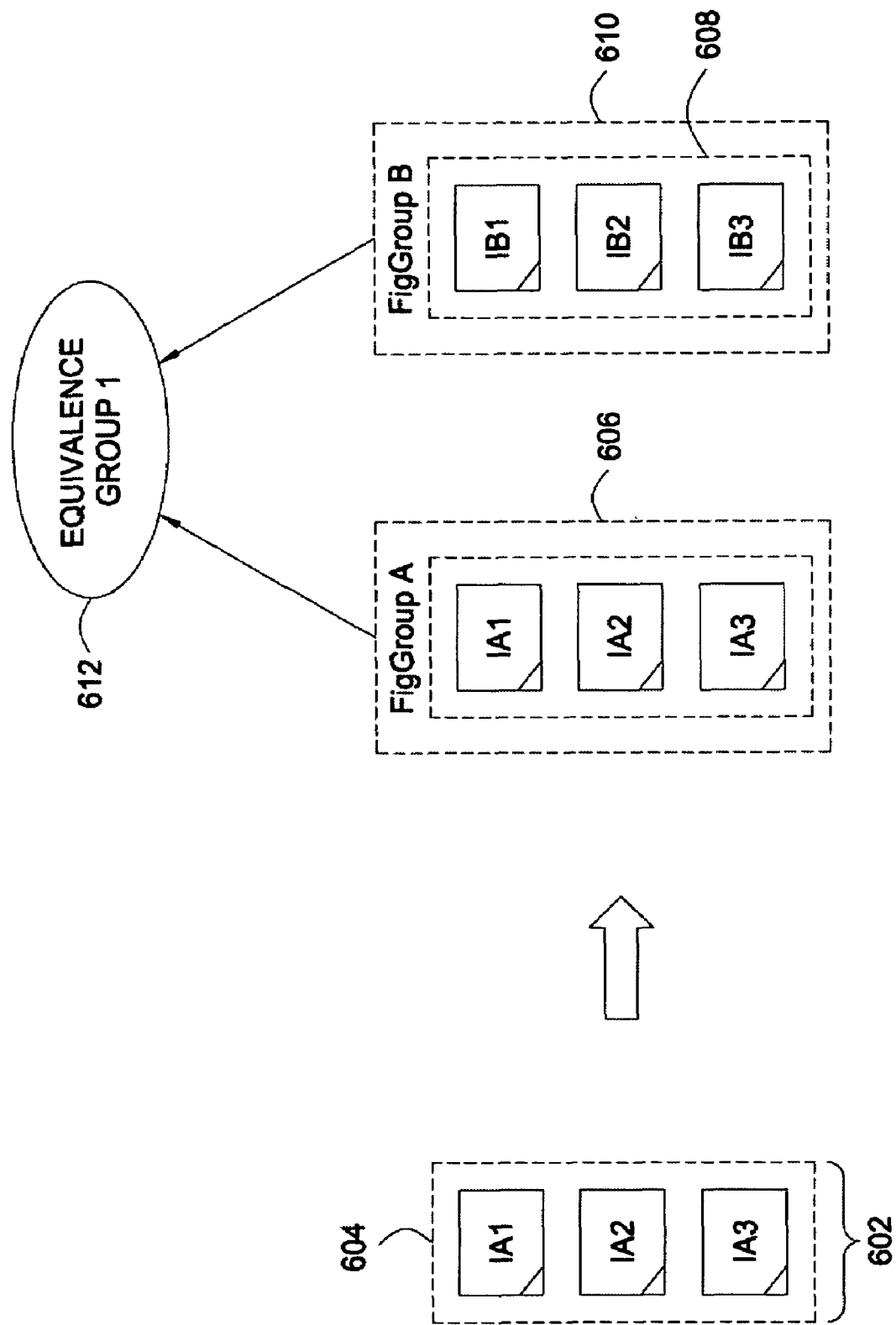
FIG. 6 represents the creation of synchronous clones having a layout clone source containing a regular subgroup in accordance with an embodiment of the present invention.

FIG. 6 represents the creation of the synchronous clones having a layout clone source containing a regular subgroup in accordance with an embodiment of the present invention. Layout clone source 602 comprises regular subgroup 604 containing three instances IA1, IA2, and IA3. A clone target is found in the schematic with three interconnected instances IB1, IB2 and IB3. Regular subgroup 604 is encapsulated in a synchronous clone subgroup 606. Clone target 608 is created by copying clone source 602 and is encapsulated in a synchronous clone subgroup 610. Subgroups 606 and 610 are added to an equivalence group 612. Thereby, subgroups 606 and 610 represent synchronous clones. As a consequence, when the clone source is strictly composed of only one regular subgroup, a hierarchical level of subgroup is added to encapsulate the regular subgroup and form synchronous clones.

Figure 7:
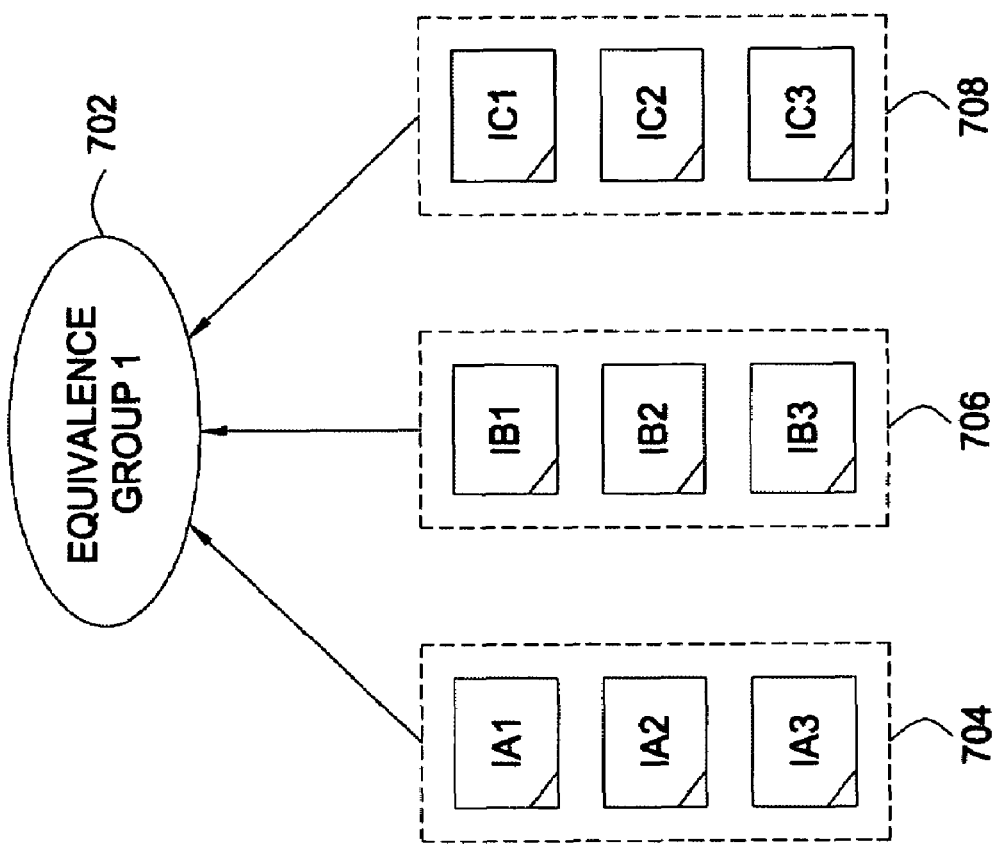
FIG. 7 represents the creation of synchronous clones having a layout clone source containing a synchronous clone in accordance with an embodiment of the present invention.
Figure 7:
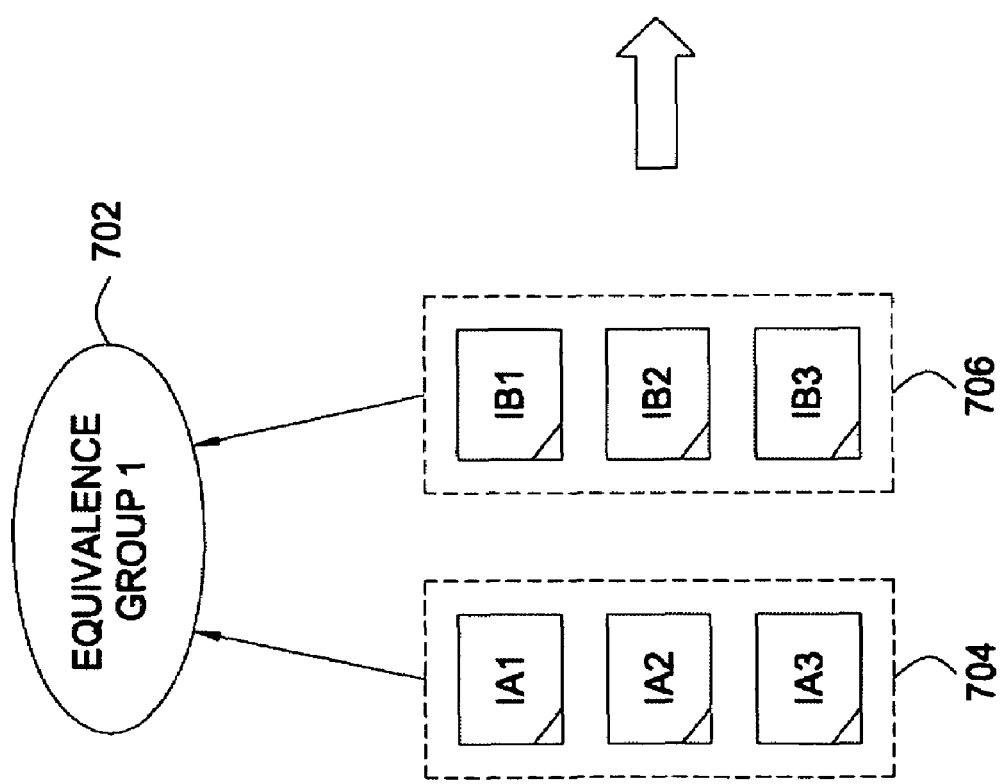

FIG. 7 represents the creation of the synchronous clones having a layout clone source containing a synchronous clone in accordance with an embodiment of the present invention. This scenario occurs, for example, when the user has already created two synchronous clones, and has stopped the clone command. The clone command is launched again to create another synchronous clone with the same layout clone source.

Equivalence group 702 comprises two synchronous clones represented by two subgroups 704 and 706. When a Create Clone command is launched, one of the subgroups for example, subgroup 704 is selected as the clone source. A clone target with figures IC1, IC2 and IC3, equivalent to the figures of the synchronous clones is found in the schematic, and placed as a synchronous clone. A subgroup 708 is created as the clone target and added to the existing equivalence group 702.

Figure 8:
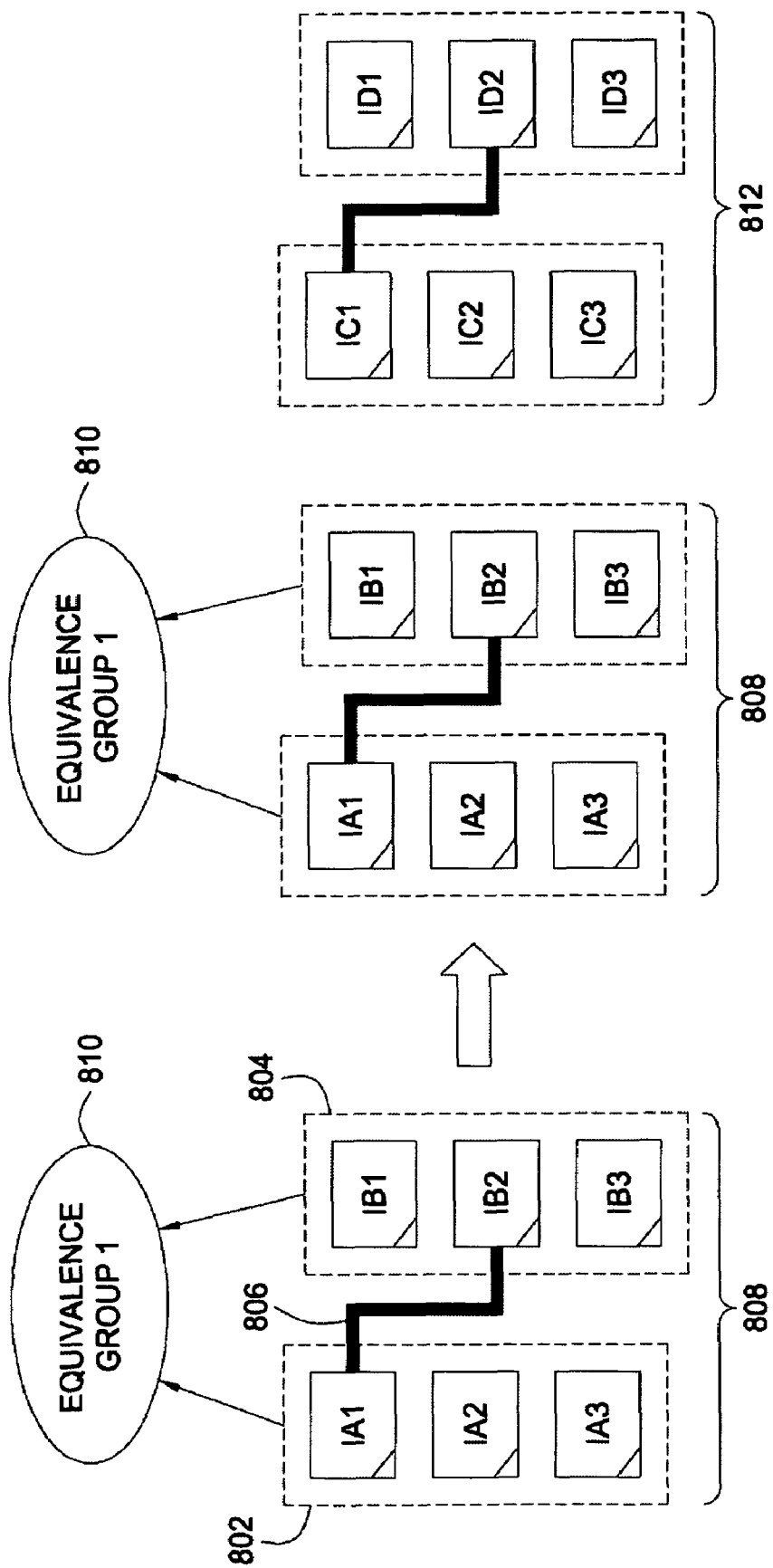
FIG. 8 represents the creation of synchronous clones having a layout clone source containing several synchronous clones in an equivalence group in accordance with an embodiment of the present invention.

FIG. 8 represents the creation of the synchronous clones having a layout clone source containing several synchronous clones in an equivalence group in accordance with an embodiment of the present invention. The embodiment comprises two synchronous clones 802 and 804 and a pathSeg 806 in layout clone source 808 encapsulated in equivalence group 810. More specifically, the pathseg is an oaPathSeg, a database object representing a segment of a path. During the synchronous clone creation, when a synchronous clone is detected in layout clone source 808, a warning is issued to inform the user that hierarchical synchronous clones are not allowed. A clone target 812 is formed by copying layout clone source 808 without an additional level of virtual hierarchy. Thus, clone target 812 is a regular subgroup.

In accordance with an embodiment of the present invention, the clone command allows cloning of Parameterized Cells (PCells) even if the PCell parameters of the figures of the schematic clone source are different from the PCell parameters of the figures of the schematic clone target. The cloning of PCells is controlled using an option for example, "Exact Parameter Match" in a Create Clone form. If the "Exact Parameter Match" check box is on, each PCell instance of one schematic clone target has the same parameters as its corresponding PCell instance in the schematic clone source. If the check box is off, one or more PCell instances of the schematic clone target may have parameters different from their corresponding PCell instances in the schematic clone source. Even when "Exact Parameter Match" is off, the layout clone source matches exactly the layout clone target (in terms of parameter). However, the schematic parameters of the clone source and the clone target may be different, but the layout parameters are always identical as while cloning, the layout target is populated from (i.e., is an exact replica of) the layout clone source.

In accordance with an embodiment of the present invention, the synchronous clones are created using a "real" clone. The creation of synchronous "mutants" is not supported as the layout implementation of two synchronous mutants is likely to be routed in a different way. Therefore, even if the instances from two mutants are identical, the shapes representing the routing of the two synchronous mutants are often different from one occurrence to another.

Once the synchronous clones are created, a consistency check may be run if the equivalence group comprising the synchronous clones does not contain the non-persistent boolean extension. The consistency check may be performed either at an initialization phase of the present invention, or before editing the synchronous clone for the first time (i.e., before launching the command "edit subgroup in place") or while creating a synchronous clone. In case, the consistency check is performed at the initialization phase, CPU resources are wasted if the user does not edit the synchronous clone. If the consistency check is performed before editing a synchronous clone, then editing the first synchronous clone may be time-consuming since the consistency check may be performed in the background. The user may be informed either by a pop-up message that the "consistency check is running and the operation may take several seconds" or a warning message may be displayed in the Command Interpreter Window (CIW).

The consistency check is required because it is possible to edit the subgroup figures without using the present invention, for example, in a third party tool. However, once the subgroup figures are edited using the third party tool, the synchronization between the subgroups is lost. This can lead to inconsistency in a synchronization mechanism if a consistency check is not performed. This is illustrated with the help of an example depicted in FIG. 9.

Figure 9:
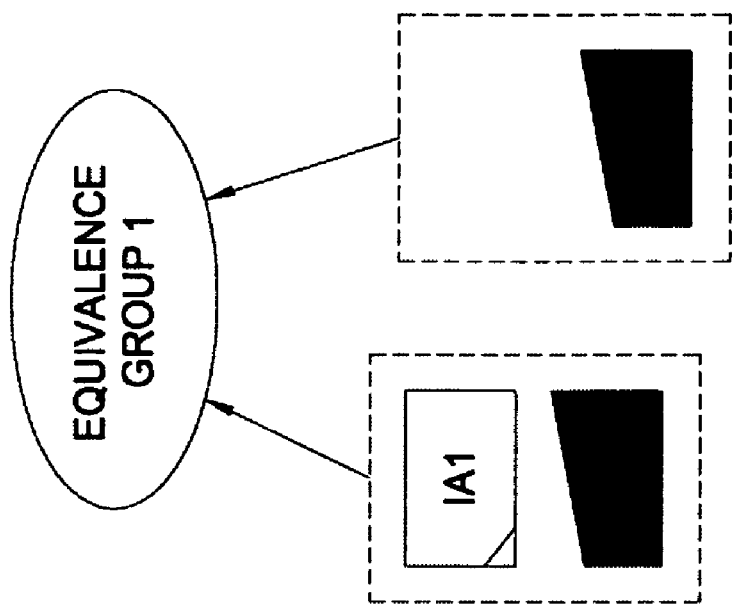
FIG. 9 illustrates inconsistency in a synchronization mechanism when consistency check is not run in an embodiment of the present invention.
Figure 9:
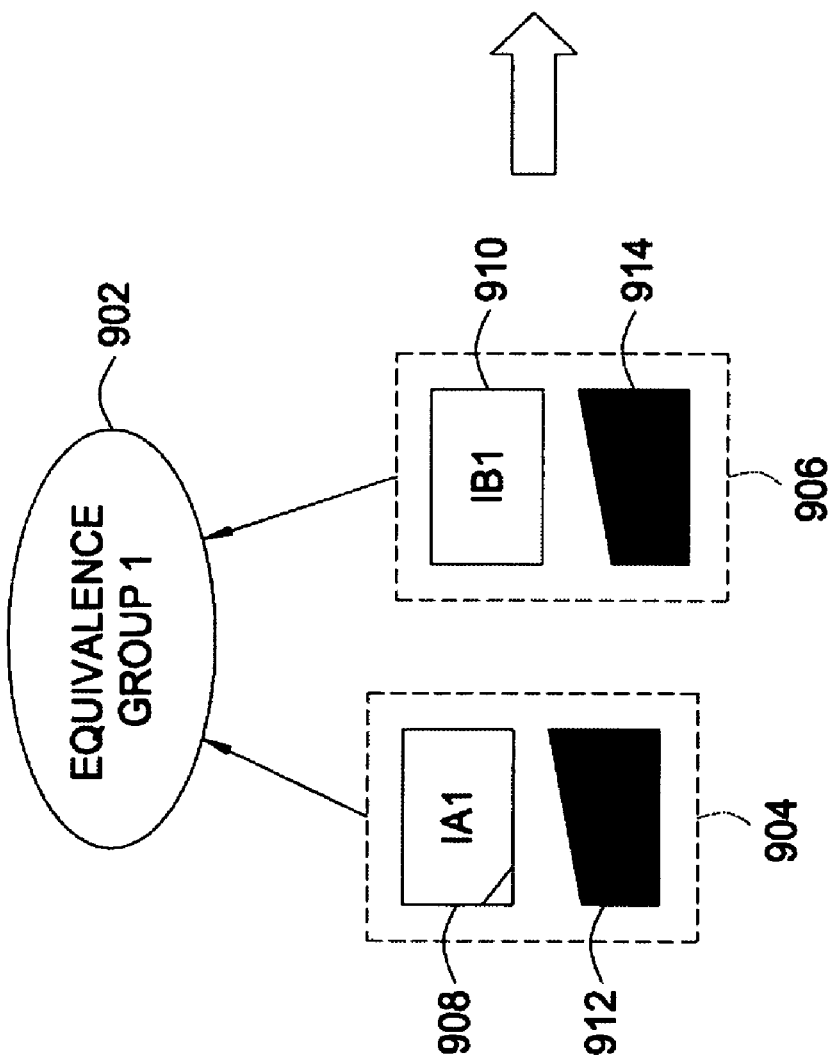

FIG. 9 illustrates loss of synchronization in the layout clones of an equivalence group in accordance with an embodiment of the present invention. The equivalence group 902 comprises two synchronous clones 904 and 906. Each synchronous clone 904 and 906 comprises an instance 908 or 910 and a shape 912 or 914, respectively. Subgroup 906 is edited using the third party tool by removing an instance 910 from subgroup 906. Later, when instance 908 is edited using the present invention, and if the consistency check is not run, it will not be possible to propagate the edit to synchronous clone 906 as instance 910 is removed from subgroup 906. Thus, the synchronization between synchronous clones 904 and 906 is lost once subgroup 906 is edited in the third party tool. It is therefore desirable to run the consistency check before editing a synchronous clone.

However, the consistency check is run only if the synchronous clones are to be updated. If only a selected subgroup is to be updated, the synchronous clones are removed from the equivalence group and the consistency check is not performed.

In accordance with an embodiment of the present invention, subgroups consisting of different number of figures may be synchronized with each other. This is possible because synchronization is checked only between the figures of subgroups supported by the present invention. The figures include shapes (rectangles, polygons, lines, paths, arcs, ellipses, dots, donuts, pathsegs), instances, vias (custom and standard), and subgroups. During the consistency check, if a figure of a different type is found in a synchronous clone, the figure is ignored. For example, labels, text displays, and cluster boundaries are skipped. The embodiment is illustrated using an example that comprises a synchronous clone with three figures (two instances and one label) to be synchronized with another synchronous clone with only two figures (two instances). The two synchronous clones will be synchronized provided the two instances are identical in the two synchronous clones.

However, in order to verify the relative position of two equivalent figures in their subgroup, a bounding box (bBox) representing the union of all the figures of each subgroup is computed before the check. Consequently, the lower left corner of the bBox (which is considered as the "origin" of the subgroup) is not dependent on the additional subgroup figures (i.e. text label, for example).

Once the consistency check is performed, the boolean extension "lxSCCheckDone" is added to the equivalence group to avoid running of the consistency check several times on the same equivalence group. The extension indicates that the consistency check is not required again while editing one of the synchronous clones of the equivalence group.

In accordance with an embodiment of the present invention, the consistency check is performed using an algorithm. For interoperability reasons, it is preferred not to store any persistent information as extensions or properties after the consistency check. The algorithm for the consistency check does not need any external information. The main advantage of the algorithm is that it allows an equivalence group to be broken into several equivalence groups. Indeed, an algorithm based on model data storing (with extensions) may lead to a loss of synchronization in some cases. For example, if each synchronous clone is modified in a similar manner in the third party tool, the subgroups may be synchronized even if they diverge from the stored model.

Figure 10:
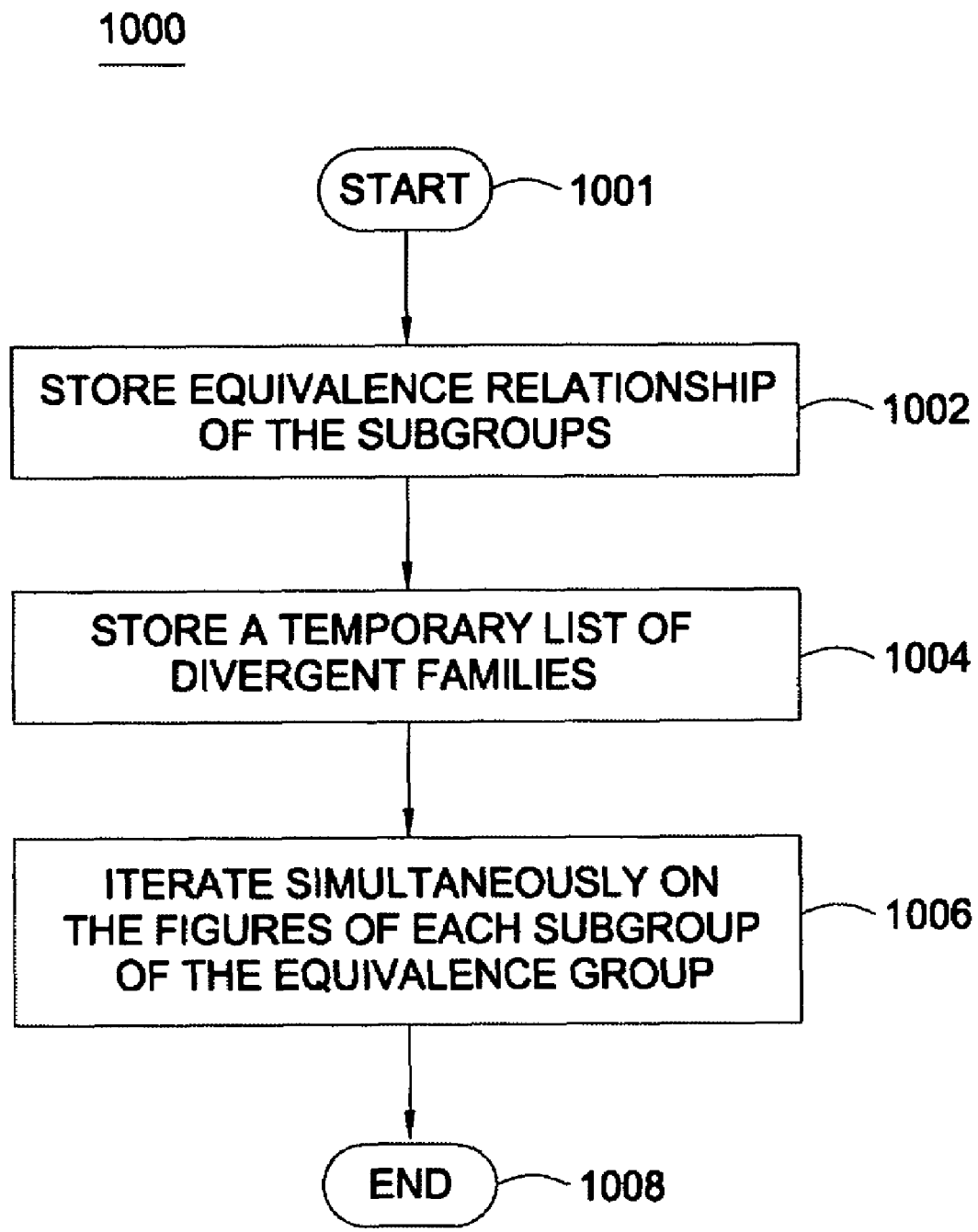
FIG. 10 illustrates a flowchart of a method for performing a consistency check in accordance with an embodiment of the present invention.

FIG. 10 is a flowchart depicting a method 1000 for performing a consistency check in accordance with an embodiment of the present invention. The consistency check is performed to ensure that the subgroups present in the equivalence group are in synchronization. The method starts at block 1001 and proceeds to block 1002. At block 1002, the equivalence relationship of the subgroups is stored in a class for example, "lxSCFamily". The class lxSCFamily is a set of subgroups. In accordance with an embodiment of the present invention, the subgroup may be set using a command std:: set<dbFigGroupId>. This avoids creating temporary equivalence group when it is not needed.

At block 1004, a temporary list of divergent families, for example, "lxSCFamilyList" is provided that stores a list of families which diverge from the current figure. In accordance with an embodiment of the present invention, the list may be stored using a command std::deque<lxSCFamily*>.

At block 1006, a new class lxEqGroupIter is introduced in order to iterate simultaneously on the figures of each subgroup of the equivalence group. The method ends at block 1008. This is explained with the help of an example. Three subgroups (subgroupA, subgroupB, subgroupC) each with four figures (FIG. 1, FIG. 2, FIG. 3, FIG. 4) are considered. A class iterator of type lxEqGroupiter is created. The class launches three iterators on the subgroup figures (one iterator on subgroupA figures, one on subgroupB figures, and one on subgroupc figures). Initially, the iterators are positioned on FIG. 1 of each subgroup. The iterators may be positioned at other figures of the subgroups. In accordance with one embodiment, the iterators may be positioned using the function "iter.getNext( )". To determine whether the subgroups are in synchronization, the iterators check all the four figures for equivalence.

In accordance with an embodiment of the present invention, a prototype of the new class lxEqGroupIter class is as follows:

```
//----------------------------------------------------------
// class IxEqGroupIter
//----------------------------------------------------------
class IxEqGroupIter {
    public:
        IxEqGroupIter(dbGroupId equivalenceGroup);
        ~IxEqGroupIter( );
        bool    done( ) const;
        void    getNext( );
        dbId    getCurrentMember(dbFigGroupId figGroupId) const;
    private:
        sdt::vector<dbGenStateId>    state_;
        std::map<dbFigGroupId, dbId> SCMembers_;
};
```

In the pseudo codes subgroups are referred as FigGroup.

The constructor initializes p iterators on the p equivalent subgroups present in the given equivalence group. The class stores, as a private member, a table containing the p dbGenStateId corresponding to the current state of the p iterator launched.

. . .
```
i = 0;
foreach (figGroupId in equivalenceGroup) {
    i++;
    state_[i] = dbStartGenFigGroupToMember(figGroupId);
    do {
        d bGenFigGroupToMember(state_[i], memberId);
    } while (is CheckedMember(memberId));
    SCMembers_[dbGetMemberFigGroup(memberId)] = memberId;
}
```
. . .

The destructor stops the "p" iterator launched (dbStopGen( )).

. . .
```
for(i = 1 top){
    dbStopGen(state_[i]);
}
```
. . .

The main functions are:
bool done( ) returns true when all iterators reach the last member.
void getNext( ) moves all the iterators to the next element and stores these elements in a table. If the element is not an appropriate figure (for example oaTextDisplay) the iterator moves several times until it finds a figure which is a checked figure or until dbGenFigGroupToMember returns NULL. When a subgroup figure iterator reaches the end, dbcNullId is stored as the memberId in the SCMembers_ map.
dbId getCurrentMember(dbFigGroupId figGroupId) searches in the SCMembers_ map the current memberId in the given subgroup. A STL map stores the memberId.

It is possible to synchronize two subgroups with different number of figures as only figures types supported by the present invention are checked. The figure types include dbcRectType, dbcPolygonType, dbcLineType, dbcPathType, dbcArcType, dbcEllipseType, dbcDonutType, dbcInstType, dbcDotType, dbcAreaBoundaryType, dbcPathSegType, dbcStdViaType, dbcCustomViaType, and dbcFigGroupType. If a different figure type is encountered during the iteration process, it is skipped.

Figure 11:
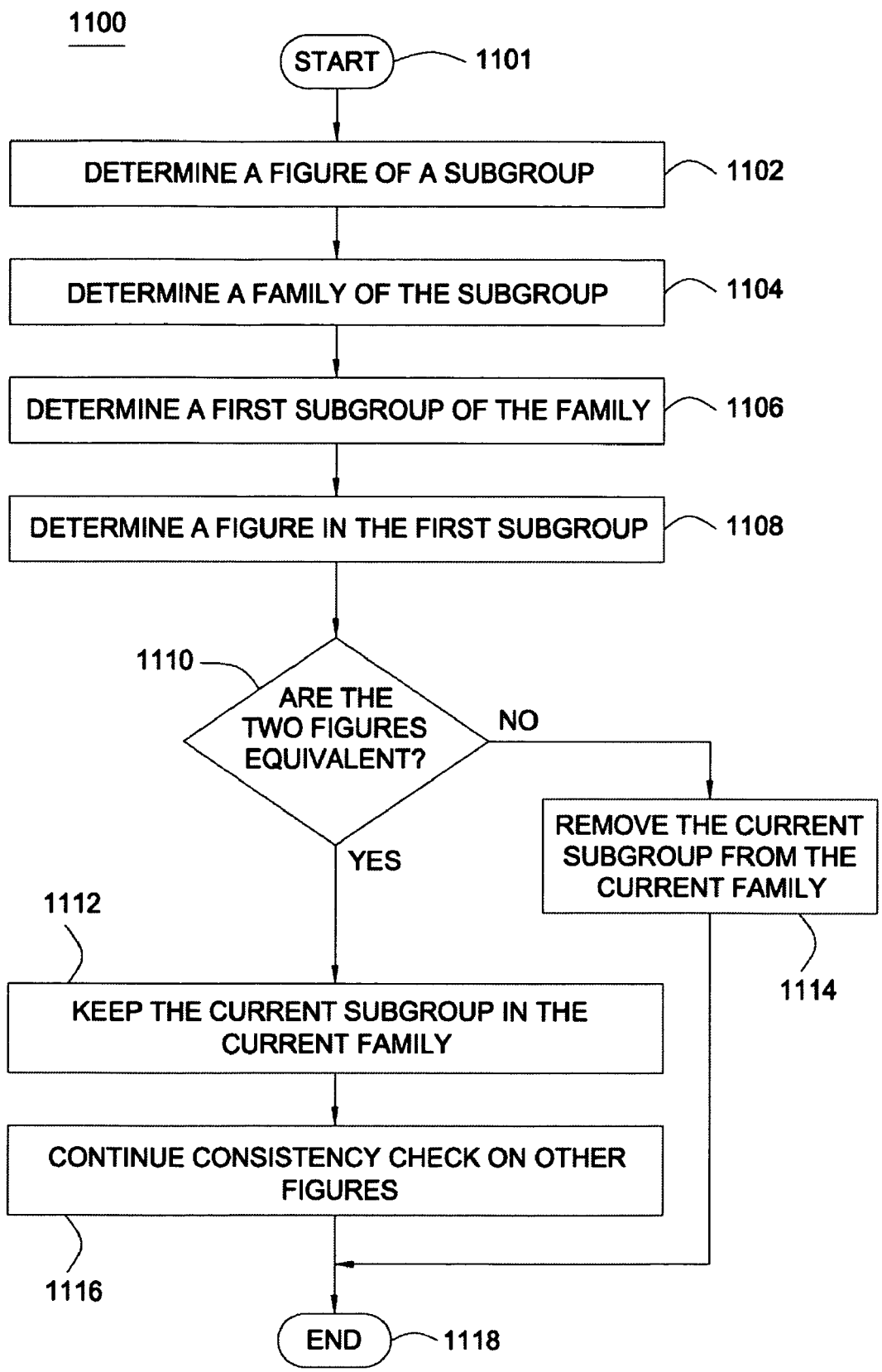
FIG. 11 illustrates a flowchart of a method of iteratively processing each subgroup of the equivalence group during the consistency check in accordance with an embodiment of the present invention.

FIG. 11 is a flowchart of a method 1100 for performing an iteration process for each subgroup of the equivalence group during the consistency check in accordance with an embodiment of the present invention. The list of divergent families is cleared. The method starts at block 1101 and proceeds to block 1102. At block 1102, a current figure of a current subgroup is determined. At block 1104, a current family of the current subgroup is determined. At block 1106, a first subgroup of the current family is determined. At block 1108, a current figure of the first subgroup of the current family is determined. At block 1110, the current figure of the current subgroup is compared with the current figure of the first subgroup. If the current figure of the current subgroup is equivalent to the current figure of the first subgroup, the current subgroup is kept in the current family at block 1112. However, if the two figures are not equivalent, the current subgroup is removed from the current family at block 1114. The consistency check is continued for other figures, if any, of the subgroups at block 1116. The method ends at block 1118.

Figure 12:
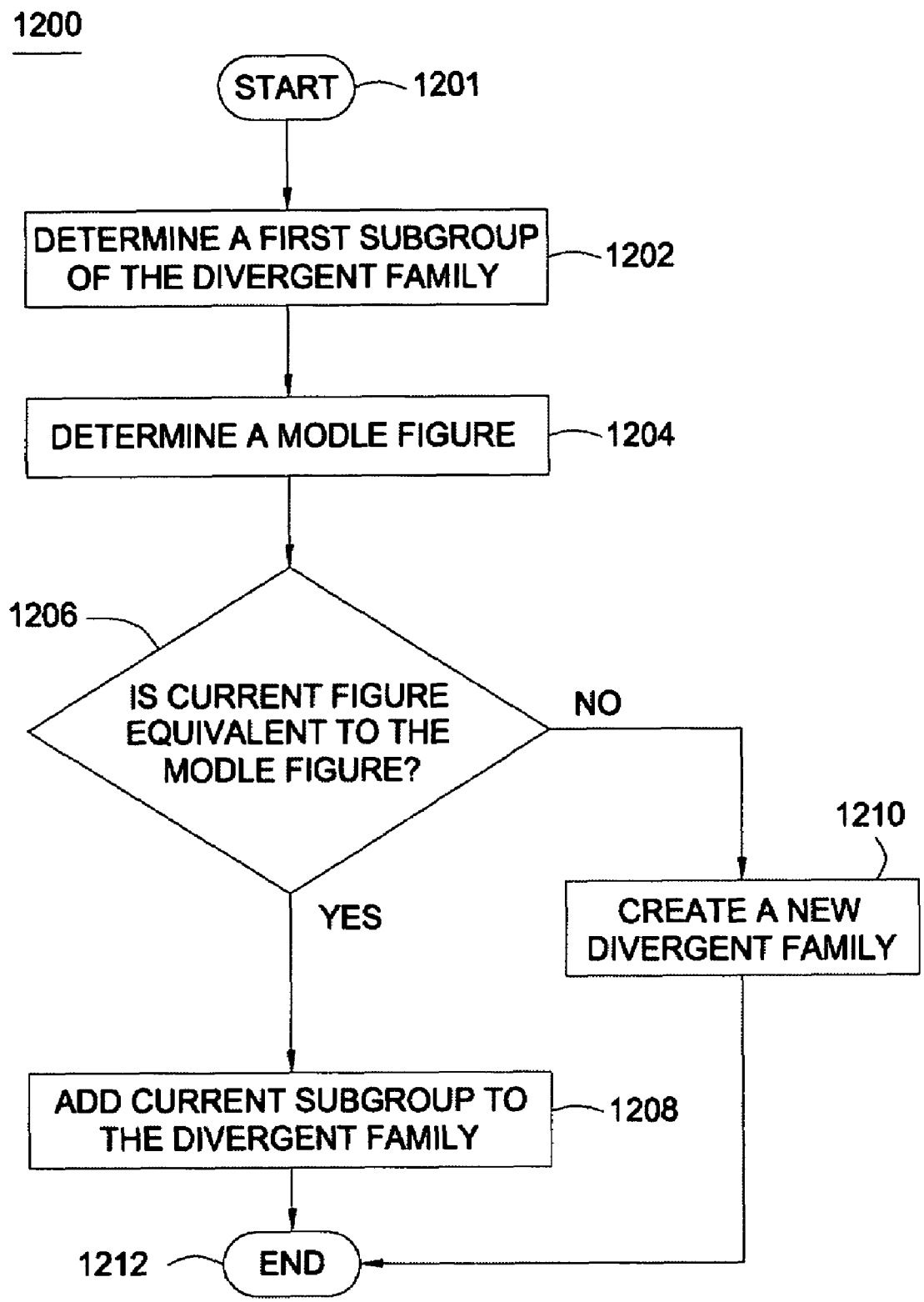
FIG. 12 illustrates a flowchart of a method for performing an iterative process for a divergent family of the current family in accordance with an embodiment of the present invention.

FIG. 12 is a flowchart of a method 1200 for performing an iteration process for a divergent family of the current family in accordance with an embodiment of the present invention. The method starts at block 1201 and proceeds to block 1202. At block 1202, for each family which diverges from the current family, a first subgroup of the divergent family is determined. Next in block 1204, a model figure is determined in the first subgroup and the current figure is compared with the model figure in block 1206. If the current figure is equivalent to the model figure, the current subgroup is added to the divergent family in block 1208. However, if the current figure is not equivalent to the model figure, a new divergent family is created for the subgroup in block 1210. The method ends in block 1212.

The foregoing description illustrates the implementation details of the method used for performing the consistency check. The method is implemented based on the classes described before. If the synchronous clones are not synchronized when the consistency check is performed on the equivalence group, the equivalence group is broken into several equivalence groups representing the real synchronization. The new equivalence groups form divergent families of the main equivalence group using the blocks described in FIG. 12.

Further, for optimal utilization of CPU resources, the equivalence between the figures of the subgroups is transitive. For example, if p subgroups are present with each subgroup having n figures, then if:

figure[i] of subgroup1 is equivalent to figure [i] of subgroup2, and figure [i] of subgroup1 is equivalent to figure [i] of subgroup3, Then figure[i] of subgroup2 is equivalent to figure[i] of subgroup3.

Therefore, the equivalence between figures of the subgroups is determined in n*p comparisons.

Further, it is assumed while checking the equivalence of figure[i] that a subgroup[x] may only belong to a family which diverges from the figure[i]. Divergent families are defined figure(s) of a subgroup which are not equivalent to the corresponding figures in other subgroups of the equivalence group. For example:

Subgroup1 and subgroup2 diverge because figure[i] of subgroup1 is not equivalent to figure[i] of subgroup2.

Subgroup3 is a subgroup of the same family as subgroup1 as the figure[I] of subgroup1 is equivalent to the figure[i] of the subgroup3.

Then, even if figure[2] of subgroup3 is equivalent to the figure[2] of subgroup2, subgroup3 does not belong to the same family as subgroup2 as their families diverged when checking figure[i].

Therefore, the list of divergent families for a given family is introduced as a private member of an IxSCSynchronizer class. The list is cleared when moving from one figure to the next one. The list is used when searching for a new family for a given subgroup.

In a worse case scenario, an equivalence group with p subgroups may be broken into p families, such that each family comprises one subgroup. Indeed, even in the worst case, the figures of the subgroups are compared two by two only once, when they diverge. The main function of the new class "IxSCSynchronizer" is to "synchronize( )" which will call check( ), and then createEquivalenceGroups( ).

In accordance with an embodiment of the present invention, a prototype for this class is as follows:

```
//......................................................................
// class IxSCSynchronizer
//......................................................................
class IxSCSynchronizer {
    public :
        IxSCSynchronizer(dbGroupId equivalenceGroup) ;
        ~IxSCSynchronizer( ) ;
        void    synchronize( ) ;
    private :
        void    check( ) ;
        void    findOrCreateDivergentFamily(dbId        memberId,
                                             dbFigGroupId  figGroupId);
        void    createEquivalenceGroups( );
        IxSCFamily & find FigGroupFamily(figGroupId);
        bool    membersAreEquivalent(dbId         member1Id,
                                      dbFigGroupId figGroup1Id,
                                      dbId         member2Id,
                                      dbFigGroupId figGroup2Id;
        IxSCFamilyList                           families_;
        IxEqGroupIter                            iter_;
        std::map<dbFigGroupId, IxSCFamily*>      SCfamilies_;
        std::map<IxSCFamily*,IxSCFamilyList>     divergentFamilies_;
};
```

The constructor initializes the synchronized iterator (iter_) with the given equivalence group and the families list which represents the list of all the detected families. At the initialization, the families list consists of only one family containing the p subgroups. However, if every subgroup is in synchronization, the families list remains unaltered.

The private function createEquivalenceGroups( ) is responsible for creating the equivalence groups representing the real synchronization (from the families_ list) and adding the non-persistent boolean extension ("IxSCCheckDone") on each newly created equivalence group to mark that it has already been checked and does not require to be checked again during the current session.

In accordance with an embodiment of the present invention, the member check( ) as well as the member findOrCreateNewFamily( ) are described below.

```
//......................................................................
// check( )
// checks that equivalence group contains only subgroups in sync.
// If it is not the case, break existing equivalence and create new
// equivalence group which reflects the real synchronization.
//......................................................................
void check( )
{
    while ( !iter_->done( ) ) {
        divergentFamilies_.clear( );
        dbGenStateId state = dbStartGenEquivalentFigGroup( );
        while(dbGenEquivalentFigGroup(state, &figGroupId))
            // find the family of figGroupId
            family = findFigGroupFamily(figGroupId);
            // find a model in order to compare to figGroupId
            refFigGroupId = get_first_figGroup_from_family(family);
            if (refFigGroupId == figGroupId )
            {
                //current figGroup is the model => nothing to do!
                continue;
            }
            refMemberId = iter_->getCurrentMember(refFigGroupId);
            memberId = iter_->getCurrentMember(figGroupId);
            if ( !memberAreEquivalent(refMemberId, refFigGroupId,
                                      memberId, figGroupId)) {
                // we know that figGroupId could only belong to a family
                // which diverges from its original family since
                // current object (not before! ).
                findOrCreateDivergentFamily(memberId, figGroupId);
            }
        }
        dbStopGen ( ) ;
        iter_->getNext( )
    }
}
//......................................................................
// findOrCreateDivergentFamily
// Try to find a family for the given figGroupId in the list of possible
// families. This list of possible families is the list stored in the
// originalFamily as divergentFamiliesList.
// Indeed figGroup could only belong to a family which
// diverges from its original family since current object.
// If an appropriate family cannot be found, a new one is created.
//......................................................................
void findOrCreateDivergentFamily(dbId        memberId,
                                  dbFigGroupId figGroupId)
{
    bool family_found = false;
    originalFamily = findFigGroupFamily(figGroupId);
    possibleFamilies = divergentFamilies_.find(originalFamily);
    if ( ! possibleFamilies.empty( ))   {
        // try to find an existing family for figGroupId
        foreach(family in possibleFamilies) {
            refFigGroupId = get_first_figGroup_from_family(family);
            refMemberId = iter_->getCurrentMember(refFigGroupId);
            if (memberAreEquivalent(refMemberId,  refFigGroupId,
                                     memberId,    figGroupId)) {
                // add figGroupId in family; remove from its orig family
                add_figGroup_in_family(figGroupId, family);
                family_found= true;
                break; // exit foreach
            }
```

-continued

```
     }
   }
   if (!family_found) {
      newFamily = create_new_family( ) ;
      // add figGroupId in newFamily; remove from its orig family
      add_figGroup_in_family(figGroupId, newFamily) ;
      add_newFamily_in_families_and_in_divergentFamilies( ) ;
   }
 }
}
```

Two subgroups are said to be equivalent if all their figures are equivalent. Two figures from two different subgroups are said to be equivalent if they both respect several criteria which depends upon the type of the figure. In a synchronous clone, only physical information is stored. Therefore, the figures considered are the shapes (rectangle, polygon, line, path, arc, ellipse dot, donut and pathseg), the instances, and the vias (custom vias and standard vias) supported by the clone command. The figures also include regular subgroups and the area boundaries which represent the boundary of the subgroups.

In accordance with an embodiment of the present invention, the pseudo-code for the main function membersAreEquivalent( ) which is a method from the lxSCSynchronizer class is as follows:

```
//.......................................................................
// membersAreEquivalent
// Returns TRUE if member1Id (from figGroup1Id) and member2Id
// (from figGroup2Id) are equivalent.
// member1Id and member2Id are said to be equivalent if different
// criteria depending on the type of member1Id and member2Id are
// respected
//.......................................................................
bool membersAreEquivalent(dbId member1Id, dbFigGroupId
              figGroup1Id, dbId member2Id, dbFigGroupId figGroup2Id)
{
  dbType type = dbGetType (member1Id) ;
  if (type ! = dbGetType (member2Id) return FALSE;
  switch (type)
    case dbcRectType :
    case dbcPolygonType :
    case dbcLineType :
    case dbcPathType :
    case dbcArcType :
    case dbcEllipseType :
    case dbcDonutType :
    case dbcDotType :
    case dbcPathSegType :
      return shapesAreEquivalent(member1Id, figGroup1Id,
                      member2Id, figGroup2Id, type) ;
    case dbcStdViaType :
    case dbcCustomViaType :
      return viasAreEquivalent(member1Id, figGroup1Id,
                      member2Id, figGroup2Id);
    case dbcFigGroupType :
      return figGroupsAreEquivalent(member1Id, figGroup1Id,
                      member2Id, figGroup2Id) ;
    case dbcInstType :
      return instsAreEquivalent(member1Id, figGroup1Id,
                      member2Id, figGroup2Id);
    default :
      return FALSE;
}
```

The function shapesAreEquivalent( ) is used to check oaShape equivalence. Two shapes are said to be equivalent if:
 They both have the same layer and purpose (getLayerNum( ) and getPurposeNum( )).
 They both have same route status (getRouteStatus( )).
 They are not a rod subpart (rodIsObjShape(shapeId)||rodIsMPPSubShape(shapeId))
 They have the same relative position. The relative position check is performed as follows:
  Get the oaTransform (trans1) of the subgroup1 (from its orient and origin).
  Get the oaTransform (trans2) of the subgroup2 (from its orient and origin).
  Apply inverse transform trans1 to shape1.
  Apply inverse transform trans2 to shape2.
  The shapes are now in the same referential, test the equality of the position is enough.

The shapes may be considered either from a position point of view or their entire point array may be considered. From the position point of view, shapes like oaRect, oaEllipse and oaDonut are fully characterized with their bBox. Regarding the other shapes, oaPolygon, oaPath, oaPathSeg, oaLine, oaArc, and oaDot, the entire point array of the shapes may be considered.

Further, particular checks are done for some shapes, for example:
 Regarding oaDonut, the whole bBox is checked.
 Regarding oaPathSeg, the segStyle is checked.
 Regarding oaPath, the width, style, beginExt and endExt is checked.
 Regarding oaDot, the width and height is checked.

The function viasAreEquivalent( ) is used to check oaVia equivalence. Two vias are said to be equivalent if:
 They both point to the same viaHeader (oaVia->getHeader( )).
 Their bBoxes are equivalent. The relative position check used for shapes may be used for vias.
 They have both the same routeTopology, direction, routeStatus and purpose (functions: getRouteTopology( ), getDirection( ), getRouteStatus( ), getPurposeNum( )).

The function figGroupsAreEquivalent( ) is used to check dbFigGroup equivalence. Two subgroups are said to be equivalent if:
 Their area boundaries are equivalent. The oaAreaBoundary are said to be equivalent if their point arrays are equivalent. The relative position check used for the shapes may be used for oaAreaBoundary.
 All their figures are equivalent. For each subgroup figure, the function lxMemberAreEquivalent is called recursively.

The function instsAreEquivalent( ) is used to check oaInst equivalence. Two instances are said to be equivalent if:
 They both point to the same instHeader (oaInst->getHeader( )).
 Their bBoxes are equivalent. The relative position check used for shapes may be used for instances.
 They both have the same placementStatus (oaInst->getPlacementStatus( )), priority (oaInst->getPriority( )), source (oaInst->getSource( )), usage (oaInst->getUsage( )), and range (oaVectorInst->getStart( ) and oaVectorInst->getStop( )).

After the consistency check is run, the subgroups are synchronized with each other by propagating an edit made in a subgroup of the equivalence group to the other subgroups of the equivalence group using a propagation mechanism. The synchronization operation is initiated in response to a command for example, "edit subgroup in place" being launched.

The propagation mechanism is developed in order to retrieve quickly the equivalence between the figures of the synchronous clones, hence speeding up the synchronous clone editing process. In accordance with an embodiment of the present invention, the propagation mechanism comprises creating an internal data structure in order to emulate the OA circular extensions. The data structure is not removed when the user calls the undo command. However, the data structure has to be maintained as soon as there is a deletion/creation of a figure inside the synchronous clone (in the mode "edit subgroup in place"). An extension from one figure to another equivalent figure may be maintained as an entry in a hash map.

If the consistency check does not need to be run (because the extension "lxSCCheckDone" is present) the circular extensions described below need to be created. In accordance with an embodiment of the present invention, the subgroup is an emulated object and not an Open Access (OA) native object. Therefore, when regular subgroups are present in the synchronous clones, the extensions are added on the oaAreaBoundary which represent the boundary of the regular subgroup. Similar extensions are created on the figures of the second regular subgroup. These extensions link the figures of the regular subgroup to their equivalent figures in the equivalent regular subgroups of other synchronous clones. However, no extension is added to the oaAreaBoundary which is the first figure of the currently edited synchronous clone. The circular extensions are deleted as soon as the mode "edit subgroup in place" is exited.

Figure 13:
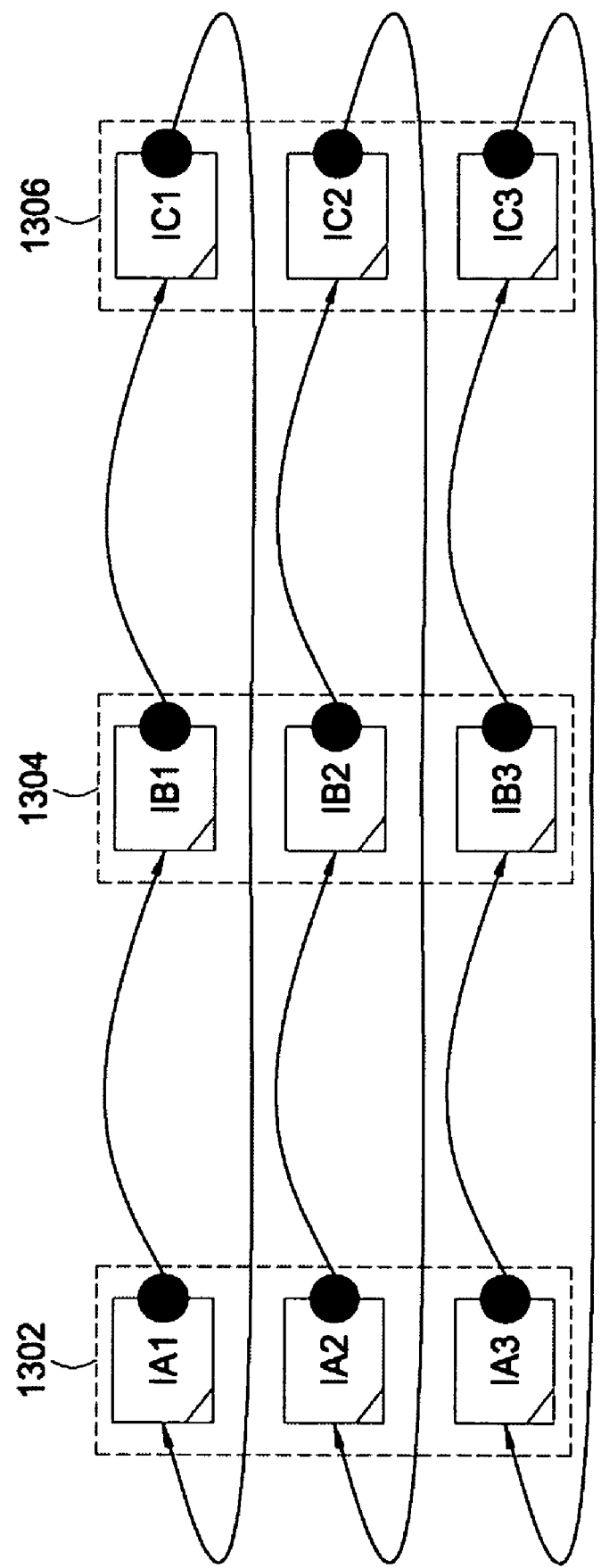
FIG. 13 is an exemplary illustration of the implementation of the circular extensions in the synchronous clones in accordance with an embodiment of the present invention.

FIG. 13 is an exemplary illustration of the implementation of the circular extensions in the synchronous clones. Three synchronous clones 1302, 1304 and 1306 are illustrated such that each synchronous clone comprises three figures, for example instances. Each figure of a synchronous clone 1302, 1304 or 1306 is linked to a corresponding figure of the other synchronous clones via the circular extensions. The circular extensions link an oaObject (oaInst) to its equivalent figure in the next subgroup. Considering the first figure of each synchronous clone, an extension is added to an instance "IA1" which points to an instance "IB1", an extension is added to the instance "IB1" which points to an instance "IC1" and an extension is added to the instance "IC1" which points to the instance "IA1". Similarly, the second and third figures may be linked.

In accordance with an embodiment of the invention, the circular extensions may be created using a new object for example, lxSCExtensionsCreator( ). The extensions may be called "SCFriend". The main function may be createExtensions( ):

```
//.............................................................................
// class lxSCExtensionsCreator
//.............................................................................
class lxSCExtensionsCreator {
  public :
     lxSCExtensionsCreator(dbGroupId equivalenceGroup);
     ~lxSCExtensionsCreator( );
     void      createExtensions ( ) ;
  private :
     void      createExtension(dbId object1,
                               dbId object2) ;
};
Here is the pseudo code for the main function createExtensions( )
//.............................................................................
// createExtensions
// creates oaExtension on each object of each figGroup of the equivalence
// group. These extensions point to the same object in the next figGroup.
// The object in the last figGroup will point to the same object in the first
// figGroup (circular extension).
//.............................................................................
void createExtensions( )
{
   lxEqGroupIter iter;
   while (!iter.done( )) {
     dbGenStateId state = dbStartGenEquivalentFigGroup( );
```

```
-continued

// keep trace of the first FG to finish the circle
    dbGenEquivalentFigGroup(state, &firstFigGroupId)) ;
    prevFigGroupId = firstFigGroupId;
    while(dbGenEquivalentFigGroup(state, nextFigGroupId))
    {
        member1Id = iter.getCurrentMember(prevFigGroupId);
        member2Id = iter.getCurrentMember(nextFigGroupId);
        createExtension(member1Id, member2Id);
        prevFigGroupId = nextFigGroupId;
    }
    // do not forget to finish the circle
    if (prevFigGroupId != firstFigGroupId) {
        // be sure there is more than one FG in the eq group!
        member1Id = iter.getCurrentMember(prevFigGroupId);
        member2Id = iter.getCurrentMember(firstFigGroupId);
        createExtension(member1Id, member2Id);
    }
    iter->getNext( );
  }
}
```

Figure 14:
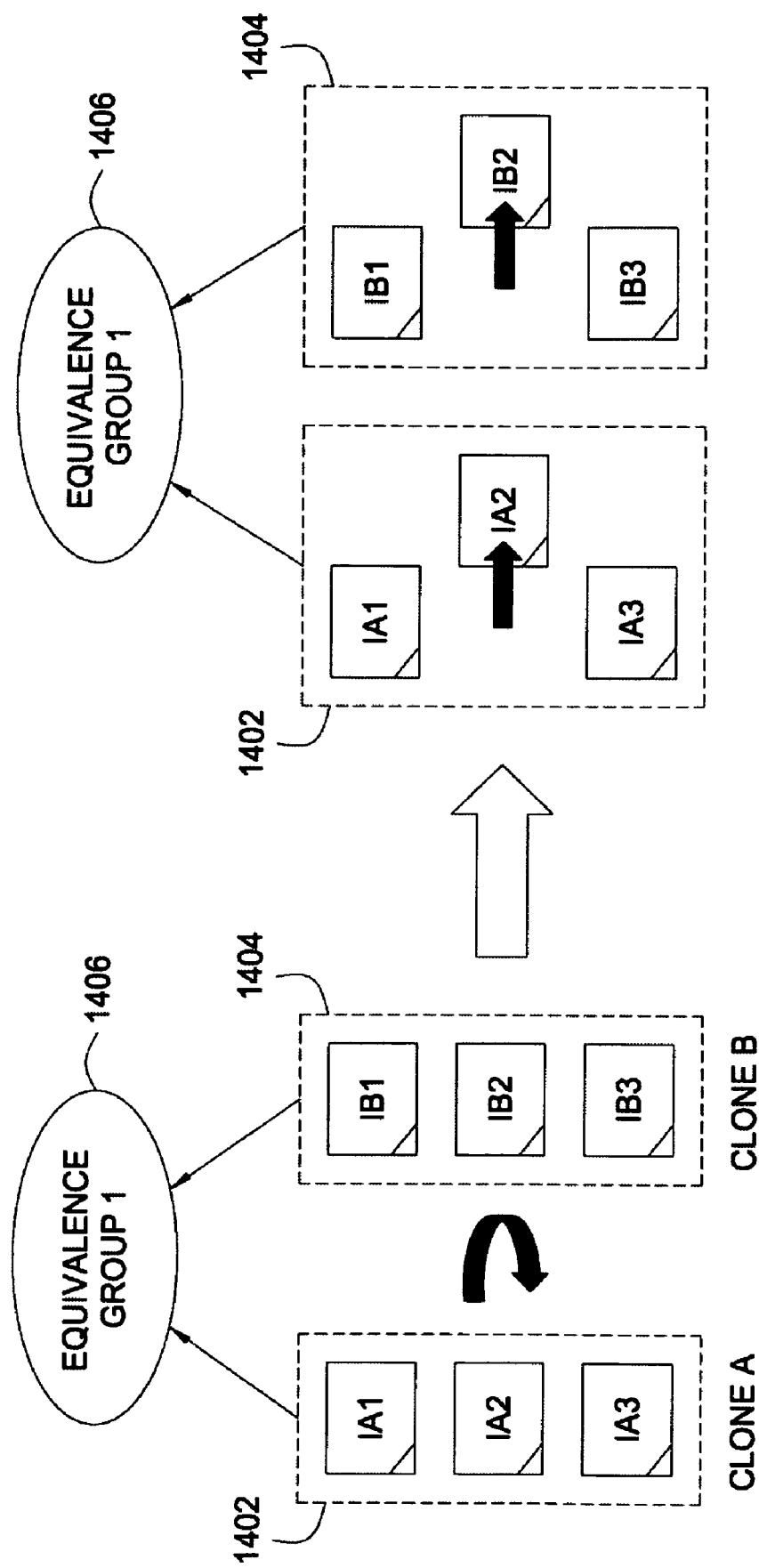
FIG. 14 is an exemplary illustration of the propagation of changes made in one subgroup to the other subgroups in accordance with an embodiment of the present invention.

FIG. 14 is an exemplary illustration of how the changes made in one subgroup are propagated to the other subgroups. The initial topology consists of two synchronous clones 1402 and 1404. Synchronous clones 1402 and 1404 are represented as two subgroups CloneA and CloneB which belong to equivalence group 1406. Once the command "edit subgroup in place" is launched and approved by the user, it is possible to edit the subgroup figures of the current synchronous clone (i.e. CloneA). The subgroup figures comprise of three instances named IA1, IA2 and IA3. If instance IA2 is moved by the user (i.e., as if he wants to move a figure at the top), the synchronization mechanism moves the equivalent figure i.e. instance IB2 in synchronous clone 1404. Thus, the same transform is applied to IA2 and IB2.

It is also possible to edit a subgroup as a single entity (i.e., as if it was an instance), since editing a subgroup does not break the synchronization. However, in this case no synchronization operation is required.

The synchronization mechanism supports only physical editing. Any connectivity modification of a figure of one synchronous clone (for example, creating an instance terminal) is not reflected in its equivalent figure in the other subgroups. Thus, since the two equivalent synchronous clones may be connected in a different way, it could lead to the creation of synchronous mutants.

When two or more synchronous groups are to be synchronized such that one figure of a subgroup is rotated, a move transformation of the figure in the subgroup implies a different move transformation of its equivalent figure(s) in other subgroup(s). The move transformation of the figure is relative to its subgroup origin and rotation. Thus, the same move transformation may not be applied to all the equivalent shape(s). As a consequence, the move transformation applied to an equivalent subgroup figure by the synchronization mechanism is computed from:

The move transformation applied by the user to the initial subgroup figure.

The orientation and rotation of the initial synchronous clone.

The orientation and rotation of the equivalent synchronous clone.

Figure 15:
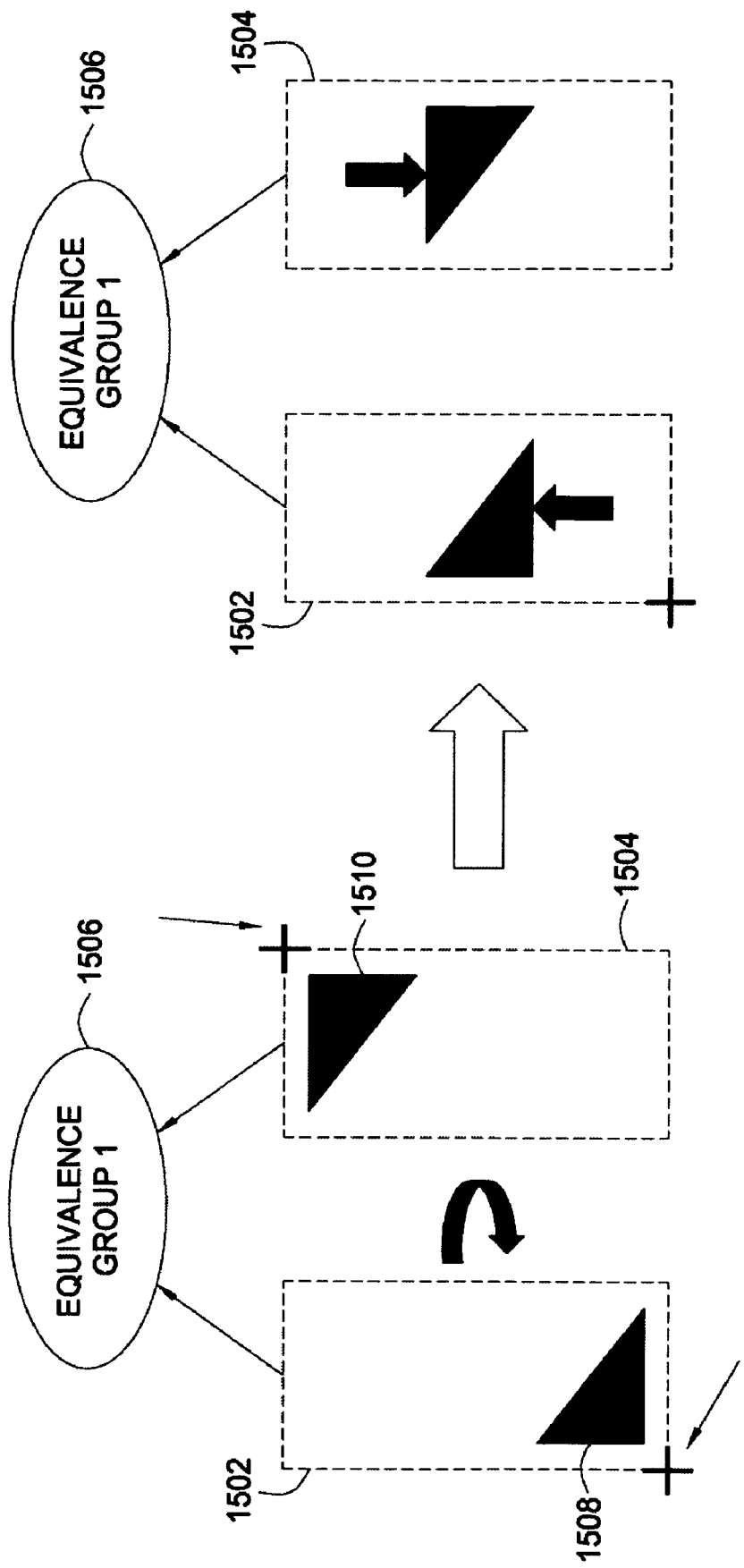
FIG. 15 is an exemplary illustration of the synchronization of a rotated synchronous clone in accordance with an embodiment of the present invention.

FIG. 15 is an exemplary illustration of synchronization between rotated synchronous clones in accordance with an embodiment of the present invention. Initial topology consists of two synchronous clones 1502 and 1504 within equivalence group 1506. Synchronous clone 1504 is a rotated version of synchronous clone 1502. Each synchronous clone consists of a figure which is a shape 1508 or 1510. Shapes 1508 and 1510 are oriented with respect to the subgroup origin. Thus, when shape 1508 of synchronous clone 1502 is moved up, the corresponding shape 1510 of synchronous clone 1504 is moved down. Synchronous clones 1502 and 1504 are in synchronization after the synchronization operation.

The synchronization mechanism is performed with post editing callback. Therefore, a DRD mode "Post-Edit Checking" must be on in order to catch DRD violations created during the synchronization mechanism in the other occurrences of the edited synchronous clone.

The foregoing description elaborates the commands not allowed when editing a synchronous clone in the mode "edit subgroup in place" in accordance with an embodiment of the present invention. However, in case of a regular subgroup if "edit subgroup in place" is launched, no action is performed.

Create instance: In the synchronous clones, the instances are not created as their connection with the other figures within the subgroup is not known. Moreover, it is not known how to bind them to the other equivalent figures of the synchronous clone. An example of such a scenario is described in FIG. 16.

Figure 16:
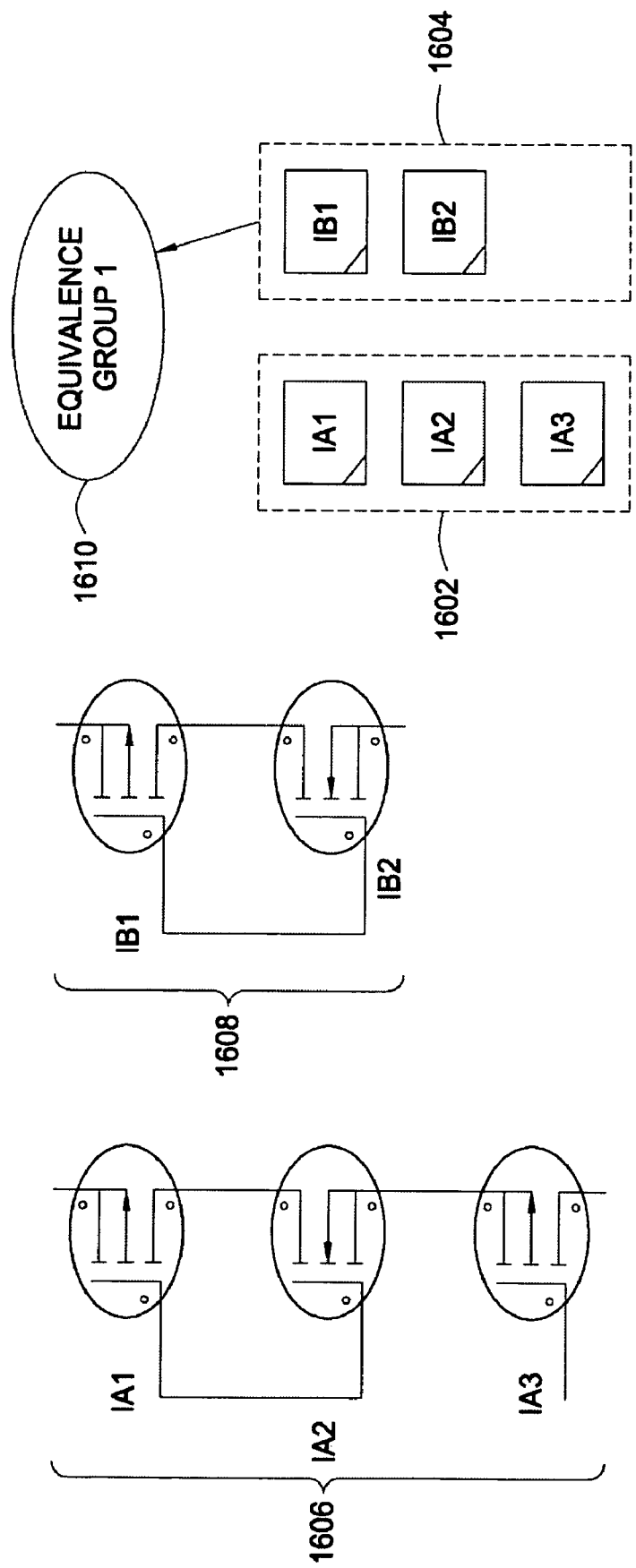
FIG. 16 is an exemplary representation of non-synchronization of addition of an instance in a synchronous clone in accordance with an embodiment of the present invention.

FIG. 16 is two synchronous clones 1602 and 1604 in the initial topology. In the schematic, schematic components 1606 and 1608 represent synchronous clones 1602 and 1604. Each synchronous clone 1602 and 1604 consists of two instances (IA1 and IA2 and IB1 and IB2). The command "edit subgroup in place" is launched on synchronous clone 1602 and a layout instance IA3 is created. With the new incremental binder, instance IA3 is automatically bound to the schematic instance IA3. But synchronous clone 1604 may not be synchronized with synchronous clone 1602.

However, using a SKILL function (dbCreateInstance( )) the instance may be added in the subgroup. The subgroup is removed from the equivalence group upon execution of the command. A warning message is displayed to inform the user that the edited subgroup is desynchronized. Consequently, an observer is added on the function "dbAddMemberToFigGroup( )".

Create Clone and Pick from Schematic: These commands are not allowed for adding an instance in a synchronous clone. However, so as to be consistent with instance creation, the commands are not disabled. If an instance is created with one of the commands, the trigger on dbAddMemberToFigGroup is called, which desynchronizes the edited subgroup. Moreover, as explained before, a warning message will be issued to inform the user.

However, the synchronous clones may be desynchronized if a synchronous clone, for example CloneB, is edited using the present invention and an instance or a shape of another synchronous clone, for example CloneC, of the equivalence group is removed using SKILL language. In this scenario, the CloneC is desynchronized and the circular extension linking the figure of the ClodneC is removed. In other words, the circular extension of CloneC is removed from the loop, however the circular extension on the CloneB figure is linked to the figure of the next Clone, for example CloneA, of the equivalence group. Consequently, an observer is added to the function "dbRemoveMemberFromFigGroup( )".

Several new Classes are implemented for the subgroups synchronization. The new classes are derived from the oaObserver class and are called as soon as an oaObject is created/deleted/modified. The oaObject present in a synchronous clone may be of four types: oaShape, oaInst, oaVia and oaAreaBoundary (from regular subgroup one "level" below).

In accordance with an embodiment of the present invention, five classes may be implemented:
lxSCShapeObserver public oaObserver<oa::oaShape>
lxSCInstObserver: public oaObserver<oa::oaInst>
lxSCViaObserver public oaObserver<oa::oaVia>
lxSCFigGroupObserver public oaObserver<oa::oaBoundary>
lxSCGroupMemberObserver public oaObserver<oa::oaGroupMember>

If the subgroup is an emulated object and not an OA native object, the subgroup observer may be derived from the optional oaBoundary observer. The area boundary is the first object of the subgroup. Moreover, the oaGroupMember is observed for the command create (regular) subgroup in a synchronous clone. Although the implementation is described using the two observers, it is possible to implement the same using a single observer.

The observers are called as soon as an oaObject is edited. During the first editing, all the equivalent figure(s) are edited. In order to avoid the observer from being called recursively, this observer is disabled until the end of the current synchronization job, when a method from lxSC<xxx>Observer class is called for the first time. In accordance with an embodiment of the present invention, two equivalent figures are called two friend figures. Accordingly, the extensions on one subgroup figure are named "SCFriend".

lxSCShapeObserver Class: The members from lxSCShapeObserver are called as soon as an oaShape object is edited. The shapes oaText and oaTextDisplay do not need to be observed because they do not appear in the synchronous clone subgroup. The type of the oaShape is checked when one of the members below is entered. Thus, the oaText and oaTextDisplay shapes are ignored.

Three functions of the oaObserver<oaShape> have to be overloaded. The functions are:

onpostcreate( ): A shape similar to the one created is added to all the equivalent subgroups. Several new extensions linking all the newly created shapes in a circular way are added. However, if an oaText or an oaTextDisplay is created it will be ignored (i.e. their creation is not reflected in equivalent subgroups).

on PreDestroy( ): All the equivalent shapes are destroyed. These shapes are found with their circular extensions created while editing the subgroup. The extensions are destroyed while destroying the oaFig.

In accordance with an embodiment of the present invention, the pseudo code for the on PreDestroy function is as follows:

```
. . .
friend =lxSCGetNextFriendObj(shape)
while (friend != shape) {
nextFriend = lxSCGetNextFriendObj(friend);
friend->destroy( );
friend = nextFriend;
}
break;
. . .
``` on PostModify( ): The function is used depending upon the oacShapeModTypeEnum passed in. However, in some cases the same function may be applied to each equivalent shape; this is the case for the following modTypes:
oacSetLPPShapeModType
oacSetLayerNumShapeModType
oacSetPurposeNumShapeModType
oacSetRouteStatusShapeModType
oacArcConvertToLineShapeModType
oacDonutConvertToPolygonShapeModType oacPathConvertToPolygonShapeModType
oacEllipseConvertToPolygonShapeModType
oacLineConvertToArcShapeModType
oacPolygonConvertToDonutShapeModType
oacPolygonConvertToEllipseShapeModType
oacPolygonConvertToPathShapeModType
oacPolygonConvertToRectShapeModType
oaRectConvertToPolygonShapeModType
oacDonutSetRadiusShapeModType
oacDonutSetHoleRadiusShapeModType
oacDotSetWidthShapeModType
oacDotSetHeightShapeModType
oacPathSetWidthShapeModType
oacPathSetStyleShapeModType
oacPathSetBeginExtShapeModType
oacPathSetEndExtShapeModType
oacPathSegSetWidthShapeModType
oacPathSegSetSegStyleShapeModType An exemplary pseudo code for the case oacSetLayerNumShapeModType is as follows:

```
. . .
newLayer = shape->getLayerNum( );
friend = lxSCGetNextFriendObj(shape);
while (friend ! = shape) {
friend->setLayerNum(newLayer);
friend = lxSCGetNextFriendObj(friend);
}
. . .
```

Regarding the modTypes, which are relative to the position change, following actions are performed:
- The position of the shape before the move operation (pre callback) is obtained.
- The position of the shape after the move operation (post callback) is obtained.
- The global transform from the aforesaid positions is computed.
- The global transform to each point or to the BBox of the equivalent shapes depending on the shape type is applied.

The concerned modTypes are:
oacArcSetShapeModType
oacArcTransformShapeModType
oacDonutSetCenterShapeModType
oacDonutTransformShapeModType
oacDotSetLocationShapeModType
oacDotSetWidthShapeModType
oacDotSetHeightShapeModType
oacDotTransformShapeModType
oacLineSetPointsShapeModType
oacPathTransformShapeModType
oacPathSetAllShapeModType
oacEllipseSetBBoxShapeModType
oacEllipseSetLocationShapeModType
oacPolygonSetPointsShapeModType
oacPolygonTransformToRectShapeModType
oacRectTransformToPolygonShapeModType
oacRectSetBBoxShapeModType
oacPathSegTransformShapeModType
oacPathSegSetAllShapeModType An exemplary pseudo code for case oacPathSetPointsShapeModType and oacPathTransformShapeModType is as follows:

```
. . .
trans1 = get_figGroup_transform(shape);
shape->getPoints(ptArray1);
friend = lxSCGetNextFriendObj(shape);
while(friend != shape) {
trans2 = get_figGroup_transform(friend);
transGlobal = concat(invert(trans1), trans2);
ptArray1->transform(transGlobal, ptArray2);
friend->setPoints(ptArray2);
friend = lxSCGetNextFriendObj(friend);
}
. . .
```

In the case the concerned shape is a rod shape (rodIsObjShape(shapeId)), it is treated as the rod master, since rodsubparts are not added to the subgroup object. Therefore, the same rod parameters are applied to its equivalent figure(s).

lxSCInstObserver Class: The lxSCInstObserver functions are called as soon as an oaInst object is edited. During modification and deletion of functions, oacScalarInstType, oacVectorInstType and oacVectorInstBitType are taken into account; however mosaics are not supported by the clone command. If an instance is created, the subgroup is removed from its equivalence group and a warning is issued to the user.

Three functions of the oaObserver<oaInst> have to be overloaded. These functions are:

on PostCreate( ): The subgroup is removed from its equivalence group and a warning is issued to the user. No synchronization job is done.

onPreDestroy( ): All the equivalent instances are destroyed.

on PostModify( ): The function is used depending upon the oacInstModTypeEnum passed in. However, the instance renaming or add/remove to cluster function is not performed.

-oacSetTransforminstModType <= paragraph to remove.

For the oacSetTransforminstModType all the friend instances are transformed the same way. The pseudo code is as follows:

```
........................................
trans1 = get_transform_from_previous_position(inst);
friend = lxSCGetNextFriendObj(inst);
while (friend != inst) {
    friend->move(trans1);
    friend = lxSCGetNextFriendObj(friend);
}
........................................
oacSetPlacementStatusInstModType
oacSetPriorityInstModType
oacSetSourceInstModType
oacSetUsageInstModType
oacVectorInstSetRangeInstModType
oacScalarizeInstModType
    All the equivalent instances are modified as the current instance
    (functions setPlacementStatus( ), setPriority( ), setSource( ),
    setUsage( ),        setRange( ),        scalarize( )).
oacSetInstHeaderInstModType
    If the instance is not a PCell, all the friend instances are set to the
    same master. If it is a PCell, with the same master, all the instance
    parameters (getParams( ) are used to apply them to all the friend
    instances (setParams( )).
``` lxSCViaObserver Class: The lxSCViaObserver functions are called when an oaVia object is edited. Three functions of the oaObserver<oaVia> have to be overloaded. The functions are:

on PostCreate( ): A via similar to the one created is added in all the equivalent subgroups.

Several new extensions linking all the newly created vias in a circular way are added.

onPreDestroy( ): All the equivalent vias are destroyed.

on PostModify( ): The changes depend on the data passed by oacViaModTypeEnum. The concerned modTypes are:

oacSetTransformViaModType: All the friend vias are modified the same way (as for instances).

oacSetRouteTopologyModType
oacSetDirectionViaModType
oacSetRouteStatusViaModType
oacSetPurposeNumViaModType: All the friend vias are modified as the current one (functions setRouteTopology( ), setDirection( ), setRouteStatus( ), setPurposeNum( )).
oacSetCustomHeaderModType
oacSetStd HeaderViaModType These modTypes correspond to a change in via parameters, thus all the parameters from the current vias (getparams( )) are required and are applied to the parameters of all the friend vias.

lxSCFigGroupObserver Class: The lxSCFigGroupObserver functions are called when an oaBoundary object is used and is edited. Only the oaAreaBoundary requests some synchronization job. First of all, it is verified whether the area boundary is the first figure of a subgroup. Moreover, the subgroup should not be the one which is currently edited. Only the area boundary of the subgroup(s) owns extension as extensions on the area boundary of the edited subgroup are not added.

Two functions of the oaObserver<oaBoundary> have to be overloaded. These functions are:

on PostCreate( ): This command does not perform any specific function as the creation of a subgroup is handled by the lxSCGroupMemberObserver class.

onPreDestroy( ): If the areaBoundary is the first member of a subgroup, all the equivalent subgroups are destroyed. The preDestroy function is used for the command "Edit->Group->UnGroup". After the execution of the command, the subgroup figures are not destroyed; however they do not belong to any subgroup (neither the regular subgroup which is destroyed nor the top synchronous clone subgroup).

...
friend = lxSCGetNextFriendObj(areaBoundary);
while (friend != guide) {
nextFriend = lxSCGetNextFriendObj(friend);
figGroupId = getFigGroupFromAreaBoundary(friend);
dbDeleteObject(figGroupId);
friend = nextFriend;
}
...

If a subgroup is destroyed (using command "Edit->Delete"), all the subgroup figures in all the equivalent subgroups are also destroyed. The command "delete" is invoked when the destroyed subgroup does not gather any figure. It is assumed that the area boundary is the last deleted element.

onPreModify( )/on FostModify( ): Only two modTypes are examined:
oacSetPointsBoundaryModType
oacSetEdgesBoundaryModType The transformation applied to the current subgroup is computed (from its position before and after), and same transform is applied to all the figures of the friend subgroup(s). The operations allowed on subgroups include move and rotate.

lxSCGroupMemberObserver Class: Another observer is created to detect the creation of a regular subgroup. The creation of the regular subgroup inside a synchronous clone subgroup is reflected in the other occurrences of the synchronous clones (i.e., in its equivalent synchronous clones). In an OA database, a regular subgroup is added to the synchronous clone subgroup by creating an OA object "group member". The creation operation is performed in the mode "edit subgroup in place".

For example, a synchronous clone subgroup named "SCTopFigGroup" is edited. A regular subgroup from a figure already present in the SCTopFigGroup is created. The new subgroup is named "VLESubFigGroup". It is assumed that the creation of the VLESubFigGroup is the first operation performed by the emulation layer. The operation involves creating an empty subgroup and adding some figures to the newly created subgroup. Consequently, lxSCGroupMemberObserver post create method is called and creation of the empty VLESubFigGroup in SCTopFigGroup is reflected. The operation is reflected in SCTopFigGroup equivalent subgroups. Next, the creation of a new figure corresponding to the "add members" to the VLESubFigGroup is called. Since the figures were previously figures of the SCTopFigGroup, all the equivalent figures of the SCTopFigGroup are known.

Thus it is possible to overload the lxSCGroupMemberObserver using on PostCreate( ) command. The command performs the following functions:

Reflects the modification in equivalent synchronous clones if empty regular subgroup is created.

Reflects the modification in equivalent synchronous clones if a figure is added to the regular subgroup.

A function may be implemented onPreDestroy command to observe the removal of one subgroup figure in SKILL.

The functions responsible for the synchronization of the synchronous clones in the equivalence group are registered as soon as the present invention is initialized. During the initialization phase, all the observers are created. However, they are disabled. When a subgroup is edited in the mode "edit subgroup in place", the functions are activated in order to enable the synchronization mechanism. Finally, the observers are disabled after return from "edit subgroup in place" and destroyed while exiting the present invention.

Update functions like Update Components and Nets (UCN) and Update Layout Parameters (ULP) do not break the synchronization of two synchronous clones. The UCN function mainly updates the nets which are not stored in the subgroup figures, and the layout components which may not be modified once the synchronous clones are properly created. The ULP function updates the parameters which may not be modified once the synchronous clones are created. For example, if an instance is added using the UCN function, the instance is not added to the subgroup.

In accordance with another example, if the schematic is modified in such that an instance of a synchronous clone is either destroyed by the UCN function or updated by the ULP function, equivalent instance will not be edited as the UCN and ULP functions do not take care of the subgroup. The equivalent instances are not edited as the lxSC<xxx>Observer classes are enabled only in the mode "edit subgroup in place". However, the boolean extension "lxSCCheckDone" is destroyed thus involving a new consistency check at the next "edit subgroup in place". When the consistency check is run again, if an instance is missing or modified in a subgroup, the subgroup is removed from the equivalence group. It is obvious to a person skilled in the art that, if the UCN or ULP functions modify several synchronous clones in the same way (remove one instance from all the synchronous clones), the synchronous clones may still be synchronized.

Although various embodiments which incorporate the teachings of the present invention have been shown and described in detail herein, those skilled in the art can readily devise many other varied embodiments that still incorporate these teachings.

What is claimed is:

1. A method for maintaining synchronization between a plurality of layout clones of an integrated circuit design, wherein each layout clone comprises at least one figure, the method comprising:
    tracking, using a computer, relationships between equivalent figures of the plurality of layout clones, wherein the plurality of layout clones are associated with one another within an equivalence group; and
    propagating an edit made in one of the layout clones within the equivalence group to the other layout clones within the equivalence group.

2. The method of claim 1, further comprising creating a subgroup for each layout clone for organizing the layout of the figures.

3. The method of claim 1, wherein the equivalence group comprises at least two subgroups.

4. The method of claim 1, wherein the figure includes an instance, a via, a shape, a regular subgroup and a combination thereof.

5. The method of claim 1, wherein the edit is performed using an operation including a move operation, a rotate operation, a delete operation, and an ungroup operation.

6. The method of claim 1, further comprises adding an extension to the equivalence group.

7. The method of claim 1, wherein tracking relationship comprises performing a consistency check.

8. The method of claim 7, wherein the equivalence group comprises at least two subgroups, and wherein the consistency check comprises:
    storing an equivalence relationship of the at least two subgroups;
    storing a temporary list of divergent families of the at least two subgroups; and
    iterating simultaneously on figures of each subgroup of the equivalence group.

9. The method of claim 8, wherein the iterating comprises:
    determining a figure of a subgroup of the at least two subgroups;
    determining a family of the subgroup;
    determining a first subgroup of the family;
    determining a figure in the first subgroup corresponding to the figure of the subgroup; and
    comparing the figure of the subgroup with the figure of the first subgroup.

10. The method of claim 7, wherein the equivalence group comprises at least two subgroups, and wherein the method further comprises rejecting a subgroup from the equivalence group upon the consistency check being unsuccessful.

11. The method of claim 1, wherein the tracking relationships comprises navigating the equivalent figures of the layout clones.

12. The method of claim 11, wherein the navigation is performed using data structures.

13. The method of claim 1, wherein the equivalence between the figures of the layout clones is transitive.

14. The method of claim 1, wherein the edit is propagated upon successful tracking.

15. The method of claim 1, wherein the edit is propagated via a data structure that links the equivalent figures in the equivalence group.

16. A computer readable medium comprising a computer readable program, wherein the computer readable program when executed on a computer causes the computer to perform a method for maintaining synchronization between a plurality of layout clones of an integrated circuit design, wherein each layout clone comprises at least one figure, the method comprising:
    tracking relationships between equivalent figures of the plurality of layout clones, wherein the plurality of layout clones are associated with one another within an equivalence group; and
    propagating an edit made in one of the layout clones within an equivalence group to the other layout clones within the equivalence group.

17. The computer readable medium of claim 16, further comprising a computer readable program for creating a subgroup on each layout clone for organizing the layout of the figures.

18. The computer readable medium of claim 16, further comprising a computer readable program for adding an extension to the equivalence group.

19. The computer readable medium of claim 16, further comprising a computer readable program for performing a consistency check.

20. The computer readable medium of claim 19, wherein the equivalence group comprises at least two subgroups, and wherein the computer readable medium further comprises a computer readable program for storing the equivalence relationship of the at least two subgroups; storing a temporary list of divergent families of the at least two subgroups; and iterating simultaneously on figures of each subgroup of the equivalence group.

21. The computer readable medium of claim 20, further comprising a computer readable program for determining a figure of a subgroup of the at least two subgroups; determining a family of the subgroup; determining a first subgroup of the family; determining a figure in the first subgroup corresponding to the figure of the subgroup; and comparing the figure of the subgroup with the figure of the first subgroup.

22. The computer readable medium of claim 19, wherein the equivalence group comprises at least two subgroups, and wherein the method further comprises a computer readable program for rejecting a subgroup from the equivalence group upon the consistency check being unsuccessful.

23. The computer readable medium of claim 16, further comprising a computer readable program for navigating the equivalent figures of the layout clones.

24. A system for maintaining synchronization between a plurality of layout clones of an integrated circuit design, wherein each layout clone comprises at least one figure, the system comprising:
    a tracking module for tracking relationships between equivalent figures of the plurality of layout clones, wherein the plurality of layout clones are associated with one another within an equivalence group; and
    a synchronization module for propagating an edit made in one of the layout clones within an equivalence group to the other layout clones within the equivalence group.

25. The system of claim 24, further comprising creating a subgroup on each layout clone for organizing the layout of the figures.

26. The system of claim 24, wherein the equivalence group comprises at least two subgroups.

27. The system of claim 24, wherein the figure includes an instance, a via, a shape, a regular subgroup and a combination thereof.

28. The system of claim 24, wherein the edit is performed using an operation including a move operation, a rotate operation, a delete operation, and an ungroup operation.

29. The system of claim 24, wherein the synchronization module synchronizes the layout clones by adding an extension to the equivalence group.

30. The system of claim 24, wherein the tracking module is configured to perform a consistency check.

31. The system of claim 24, wherein the tracking module is configured to navigate the equivalent figures of the layout clones.

32. The system of claim 31, wherein the navigation is performed using data structures.

33. The system of claim 24, wherein the edit is propagated via a data structure that links the equivalent figures in the equivalence group.

* * * * *